US012675963B2

(12) United States Patent
Lee et al.

(10) Patent No.: US 12,675,963 B2
(45) Date of Patent: Jul. 7, 2026

(54) HEAD-MOUNTED ELECTRONIC DEVICE FOR CONVERTING A SCREEN OF AN ELECTRONIC DEVICE INTO EXTENDED REALITY AND ELECTRONIC DEVICE CONNECTED THERETO

(71) Applicant: SAMSUNG ELECTRONICS CO., LTD., Suwon-si (KR)

(72) Inventors: Eunbin Lee, Suwon-si (KR); Sookkyung Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 144 days.

(21) Appl. No.: 18/384,354

(22) Filed: Oct. 26, 2023

(65) Prior Publication Data

US 2024/0071021 A1 Feb. 29, 2024

Related U.S. Application Data

(63) Continuation of application No. PCT/KR2023/012464, filed on Aug. 23, 2023.

(30) Foreign Application Priority Data

Aug. 26, 2022 (KR) ........................ 10-2022-0107810
Sep. 29, 2022 (KR) ........................ 10-2022-0124145

(51) Int. Cl.
 *G06T 19/20* (2011.01)
 *G06T 7/50* (2017.01)
 *G09G 3/20* (2006.01)

(52) U.S. Cl.
 CPC ................ *G06T 19/20* (2013.01); *G06T 7/50* (2017.01); *G09G 3/20* (2013.01); *G06T 2210/32* (2013.01);
 (Continued)

(58) Field of Classification Search
 CPC ....... G06T 19/20; G06T 7/50; G06T 2210/32; G06T 2219/2012; G06T 2219/2016;
 (Continued)

(56) References Cited

U.S. PATENT DOCUMENTS 9,727,996 B2 8/2017 Pandey et al.
2012/0206452 A1* 8/2012 Geisner ................... G06F 3/013
 345/419

(Continued)

FOREIGN PATENT DOCUMENTS

CN 113672085 A 11/2021
JP 2016507970 A 3/2016
 (Continued)

OTHER PUBLICATIONS

Kevin P. Pfeil et al., Distance Perception with a Video See-Through Head-Mounted Display, Association for Computing Machinery, United States of America.

(Continued)

*Primary Examiner* — Grace Q Li
(74) *Attorney, Agent, or Firm* — CANTOR COLBURN LLP

(57) ABSTRACT

A head-mounted electronic device configured to convert a screen of an electronic device into an extended reality and the electronic device connected thereto are disclosed. The electronic device includes a processor further configured to convert objects into a plurality of virtual objects to display the objects in a visual image output by a display of the head-mounted electronic device. The electronic device includes the processor further configured to verify information on a theme corresponding to a color of an execution screen of an application and information on the visual image output by the display of the head-mounted electronic device. The electronic device includes the processor further config- (Continued)

ured to control at least one of a brightness and a saturation of the virtual objects based on at least one of the information on the theme and the information on the visual image.

13 Claims, 16 Drawing Sheets

(52) U.S. Cl.
CPC ................. *G06T 2219/2012* (2013.01); *G06T 2219/2016* (2013.01); *G09G 2320/0626* (2013.01); *G09G 2340/145* (2013.01)

(58) Field of Classification Search
CPC ............. G09G 3/20; G09G 2320/0626; G09G 2340/145; G09G 5/10; G09G 2354/00; G09G 3/003; G06F 3/011; G02B 2027/014
See application file for complete search history.

(56) References Cited

U.S. PATENT DOCUMENTS

| | | | |
|---|---|---|---|
| 2012/0302289 A1 | 11/2012 | Kang | |
| 2013/0242262 A1 | 9/2013 | Lewis | |
| 2017/0099602 A1 | 4/2017 | Joo et al. | |
| 2018/0190019 A1* | 7/2018 | Glynn | H04L 67/131 |
| 2018/0364875 A1* | 12/2018 | Lee | G06F 3/04817 |
| 2019/0164336 A1* | 5/2019 | Chen | G06F 3/0304 |
| 2019/0227323 A1* | 7/2019 | Sendai | G06F 3/04847 |
| 2020/0244944 A1 | 7/2020 | Xin et al. | |
| 2022/0237913 A1* | 7/2022 | Wyble | G02B 27/0101 |
| 2022/0335673 A1* | 10/2022 | Jang | G06T 11/00 |

FOREIGN PATENT DOCUMENTS

| | | |
|---|---|---|
| KR | 20170027135 A | 3/2017 |
| KR | 20170040872 A | 4/2017 |
| KR | 20190053278 A | 5/2019 |
| KR | 102159753 B1 | 9/2020 |
| KR | 20210042065 A | 4/2021 |
| KR | 20220053394 A | 4/2022 |

OTHER PUBLICATIONS

International Search Report for International Application No. PCT/KR2023/012464; International Filing Date Aug. 23, 2023; International Search Report Mail Date Nov. 22, 2023; 5 Pages.
Extended European Search Report, Application No. 23857713.4; mailed Jul. 10, 2025; 8 pages.

* cited by examiner

HEAD-MOUNTED ELECTRONIC DEVICE FOR CONVERTING A SCREEN OF AN ELECTRONIC DEVICE INTO EXTENDED REALITY AND ELECTRONIC DEVICE CONNECTED THERETO

CROSS-REFERENCE TO RELATED APPLICATIONS

This application is a continuation application of International Application No. PCT/KR2023/012464, designating the United States, filed on Aug. 23, 2023, in the Korean Intellectual Property Receiving Office and claiming priority to Korean Patent Application No. 10-2022-0107810, filed on Aug. 26, 2022, and Korean Patent Application No. 10-2022-0124145, filed on Sep. 29, 2022, in the Korean Intellectual Property Office, the disclosures of which are incorporated by reference herein in their entireties.

BACKGROUND

1. Field

The disclosure relates to a head-mounted electronic device for converting a screen of an electronic device into extended reality. The disclosure relates to the electronic device that is connected to the head-mounted electronic device.

2. Description of Related Art

A head-mounted electronic device has been developed to provide a user with augmented reality, virtual reality, mixed reality, and/or extended reality experiences. The above description is information the inventor(s) acquired during the course of conceiving the present disclosure, or already possessed at the time, and is not necessarily art publicly known before the present application was filed.

SUMMARY

According to one embodiment, an electronic device may be connected to a head-mounted electronic device. The electronic device may include a memory. The electronic device may further include a display. The electronic device may further include a processor configured to receive a plurality of objects related to an execution screen of an application stored in the memory to be displayed on the execution screen of the application being executed by the electronic device from the memory. The display may display the execution screen of the application. The execution screen may include the objects. The objects may display pieces of content related to the application. The electronic device may include the processor further configured to convert the objects into a plurality of virtual objects to display the objects in a visual image output by a display of the head-mounted electronic device. The electronic device may include the processor further configured to verify information on a theme corresponding to a color of the execution screen of the application and information on the visual image output by the display of the head-mounted electronic device. The electronic device may include the processor further configured to control at least one of a brightness and a saturation of the virtual objects based on at least one of the information on the theme and the information on the visual image.

According to one embodiment, a method of operating an electronic device includes receiving information including a plurality of objects related to an execution screen of an application stored in a memory to be displayed on the execution screen of the application being executed by the electronic device from the memory of the electronic device. The display of the electronic device may display the execution screen of the application. The execution screen may include the objects. The objects may display pieces of content related to the application. The method of operating the electronic device may include converting the objects into a plurality of virtual objects to display the objects in a visual image output by a display of the head-mounted electronic device. The method of operating the electronic device may include verifying information on a theme corresponding to a color of the execution screen of the application and information on the visual image output by the display of the head-mounted electronic device. The method of operating the electronic device may include controlling at least one of a brightness and a saturation of the virtual objects based on at least one of the information on the theme and the information on the visual image.

According to one embodiment, a head-mounted electronic device includes a camera. The head-mounted electronic device may further include a display. The head-mounted electronic device may further include a processor configured to control the camera to capture a surrounding environment of a user. The head-mounted electronic device may further include the processor configured to control a display to display a first visual image configured to output the surrounding environment of the user captured by the camera or a second visual image configured to output a virtual environment. The processor may receive information including a plurality of objects related to an execution screen of an application being executed from an electronic device. The display of the electronic device may display the execution screen of the application. The execution screen may include the objects. The objects may display pieces of content related to the application. The processor may convert the objects into a plurality of virtual objects to display the objects included by the information in a visual image output by a display of the head-mounted electronic device. The processor may verify information on a theme corresponding to a color of the execution screen of the application and information on the visual image output by the display of the head-mounted electronic device. The processor may control at least one of a brightness and a saturation of the virtual objects based on at least one of the information on the theme and the information on the visual image.

According to one embodiment, a method of operating a head-mounted electronic device includes receiving information including a plurality of objects related to an execution screen of an application being executed from an electronic device. The display of the electronic device may display the execution screen of the application. The execution screen may include the objects. The objects may display pieces of content related to the application. The method of operating the head-mounted electronic device may convert the objects into a plurality of virtual objects to display the objects included by the information in a visual image output by a display of the head-mounted electronic device. The method of operating the head-mounted electronic device may verify information on a theme corresponding to a color of the execution screen of the application and information on the visual image output by the display of the head-mounted electronic device. The method of operating the head-mounted electronic device may control at least one of a brightness and a saturation of the virtual objects based on at least one of the information on the theme and the information on the visual image.

According to one embodiment, a non-transitory computer-readable storage medium may store one or more programs executable by a processor. The one or more programs, when executed by the processor, may include receiving information including a plurality of objects related to an execution screen of an application stored in a memory to be displayed on the execution screen of the application being executed by an electronic device from the memory. A display of the electronic device may display the execution screen of the application. The execution screen may include the objects. The objects may display pieces of content related to the application. The one or more programs may include converting the objects into a plurality of virtual objects to display the objects included by the information in a visual image output by a display of the head-mounted electronic device. The one or more programs may include verifying information on a theme corresponding to a color of the execution screen of the application and information on the visual image output by the display of the head-mounted electronic device. The one or more programs may include controlling at least one of a brightness and a saturation of the virtual objects based on at least one of the information on the theme and the information on the visual image.

According to one embodiment, a non-transitory computer-readable storage medium may store one or more programs executable by a processor. The one or more programs, when executed by the processor, may include receiving information including a plurality of objects related to an execution screen of an application being executed from an electronic device. A display of the electronic device may display the execution screen of the application. The execution screen may include the objects. The objects may display pieces of content related to the application. The one or more programs may convert the objects into a plurality of virtual objects to display the objects included by the information in a visual image output by a display of the head-mounted electronic device. The one or more programs may verify information on a theme corresponding to a color of the execution screen of the application and information on the visual image output by the display of the head-mounted electronic device. The one or more programs may control at least one of a brightness and a saturation of the virtual objects based on at least one of the information on the theme and the information on the visual image.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
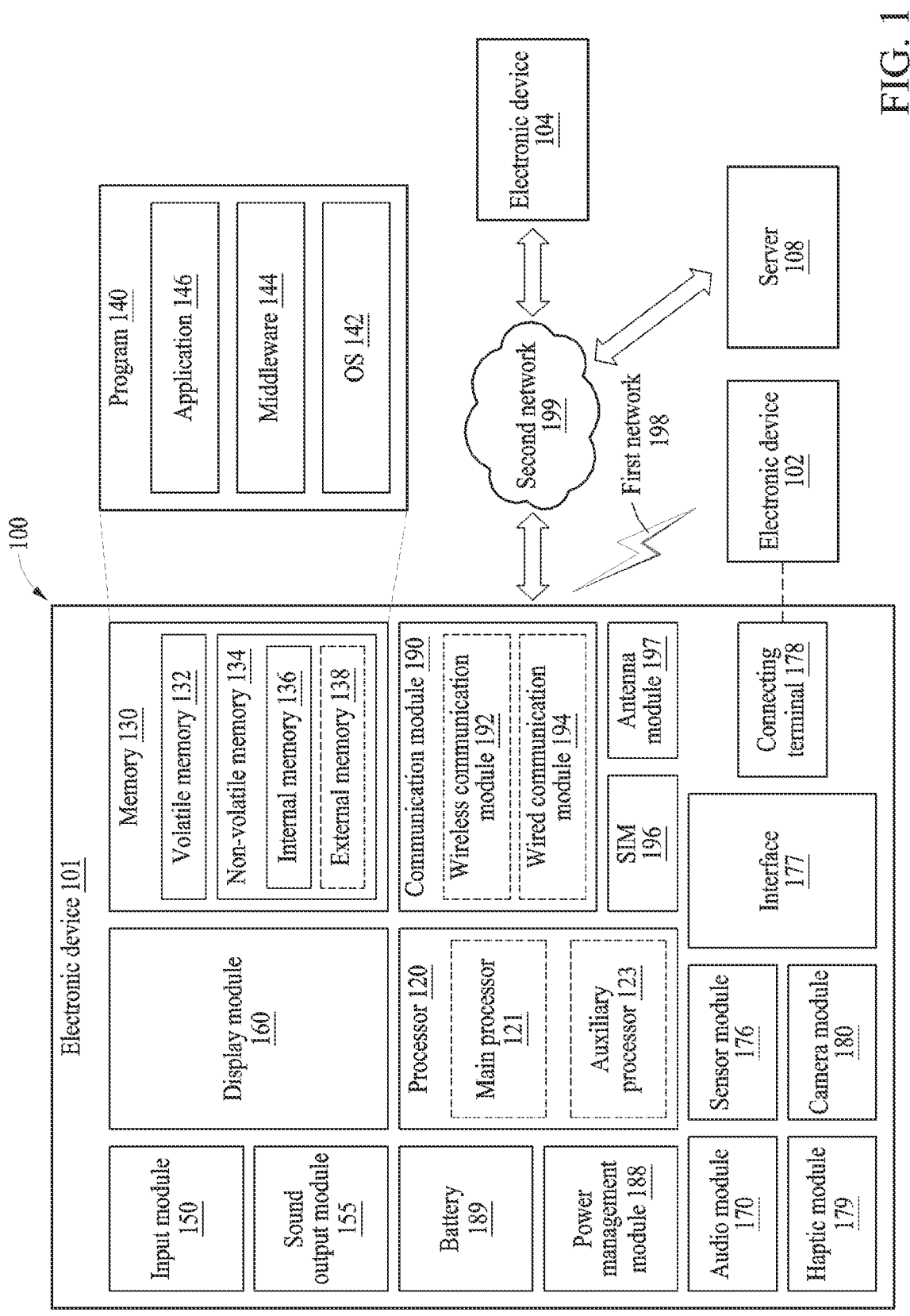
FIG. 1 is a block diagram illustrating an electronic device in a network environment according to one embodiment.

FIG. 1 is a block diagram illustrating an electronic device 101 in a network environment 100, according to one embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to one embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, or the projector. According to one embodiment, the display module 160 may include a touch sensor adapted to detect a touch, or a pressure sensor adapted to measure the intensity of force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to one embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, image signal processors, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large-scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197. According to one embodiment, the antenna module 197 may form a mmWave antenna module. According to one embodiment, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. According to one embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra-low-latency services using, e.g., distributed computing or MEC. In an embodiment, the external electronic device (e.g., the electronic device 104) may include an Internet-of-things (IoT) device. The server 108 may be an intelligent server using machine learning and/or a neural network. According to one embodiment, the external electronic device (e.g., the electronic device 104) or the server 108 may be included in the second network 199. The electronic device 101 may be applied to intelligent services (e.g., smart home, smart city, smart car, or healthcare) based on 5G communication technology or IoT-related technology.

In an embodiment, the external electronic device 102 may render content data executed in an application and transmit the rendered content data to the electronic device 101. The electronic device 101 receiving the content data may output the content data to the display module 160. If the electronic device 101 detects a motion of a user through an inertial measurement unit (IMU) sensor, and the like, the processor 120 of the electronic device 101 may correct the rendered data received from the external electronic device 102 based on information on the motion and output the corrected data to a display module 160. Alternatively, the processor 120 may transmit the information on the motion to the external electronic device 102 and request the rendering such that screen data may be updated according to the information. According to one embodiment, the external electronic device 102 may be a device in various forms, such as a smartphone or a case device for storing and charging the electronic device 101.

Figure 2:
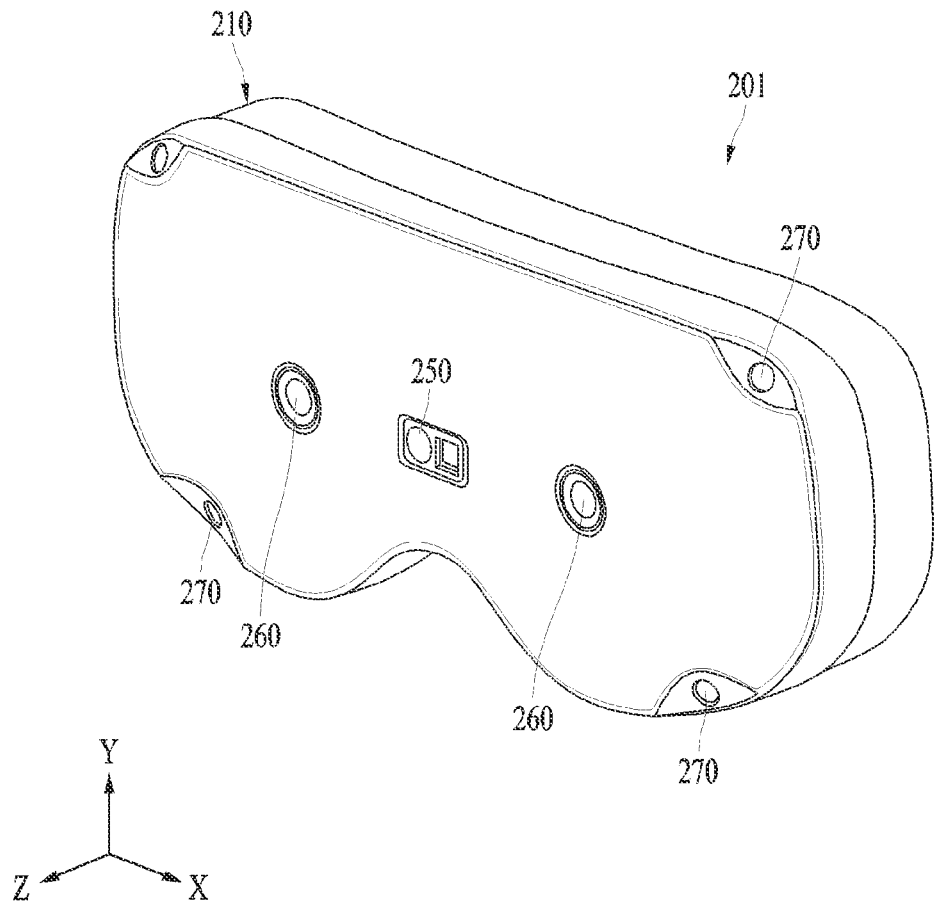
FIG. 2 is a front perspective view illustrating a head-mounted electronic device according to one embodiment.
Figure 3:
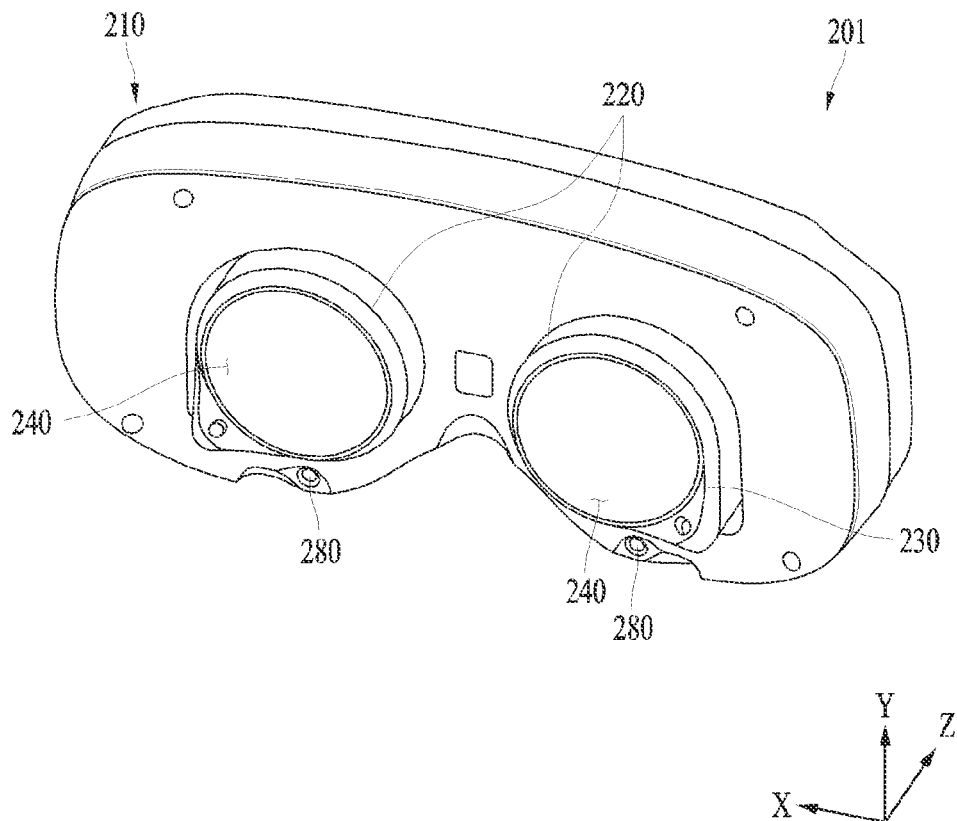
FIG. 3 is a rear perspective view illustrating the head-mounted electronic device according to one embodiment.

FIG. 2 is a front perspective view illustrating a head-mounted electronic device according to one embodiment. FIG. 3 is a rear perspective view illustrating the head-mounted electronic device according to one embodiment.

Referring to FIGS. 2 and 3, a head-mounted electronic device 201 (e.g., the electronic device 101 of FIG. 1) may be worn by a part of the body of a user and provide a user interface. For example, the head-mounted electronic device 201 may provide the user with augmented reality (AR), virtual reality (VR), mixed reality (MR) and/or extended reality (XR) experiences.

According to one embodiment, the head-mounted electronic device 201 may include a housing 210. The housing 210 may include at least one component.

According to one embodiment, the head-mounted electronic device 201 may include a lens structure 220. The lens structure 220 may include a plurality of lenses 230 configured to adjust the focus of an image provided to the user. For example, the lenses 230 may be configured to adjust the focus of an image output by a display 240. The lenses 230 may be at a position corresponding to a position of the display 240. The lenses 230 may include, for example, a Fresnel lens, a pancake lens, a multichannel lens, and/or other suitable lenses. The lens structure 220 may be the rear surface of the housing 210.

In an embodiment, the head-mounted electronic device 201 may include the display 240 (e.g., the display module 160 of FIG. 1). The display 240 may provide the user with an image (e.g., a virtual environment). For example, the display 240 may include a liquid crystal display (LCD), a digital mirror device (DMD), a liquid crystal on silicon (LCoS), an organic light-emitting diode (OLED), and/or a micro light-emitting diode (micro-LED). According to one embodiment, when the display 240 is one of the LCD, the DMD, and the LCoS, the display 240 may include a light source (not shown) configured to transmit an optical signal to a region from which an image is output. According to one embodiment, when the display 240 is the OLED or the micro-LED, the display 240 may provide the user with an image by autonomously generating an optical signal. According to one embodiment, the display 240 may provide the user with a different experience according to whether a first camera 260 operates. For example, when the first camera 260 is operating, the display 240 may display an external environment captured by the first camera 260 and provide the user with an AR or visual see-through (VST) experience. For example, when the first camera 260 is not operating, the display 240 may display a virtual environment and provide the user with a VR experience.

In an embodiment, the head-mounted electronic device 201 may include a sensor 250 (e.g., the sensor module 176 of FIG. 1). The sensor 250 may be configured to sense a depth of a subject. The sensor 250 may be configured to transmit a signal to the subject and/or receive a signal from the subject. For example, a transmission signal may include a near-infrared ray, an ultrasonic wave, and/or a laser. The sensor 250 may be configured to measure a time of flight (ToF) of a signal to measure a distance between the head-mounted electronic device 201 and the subject.

In an embodiment, the head-mounted electronic device 201 may include a plurality of first cameras 260 (e.g., the camera module 180 of FIG. 1). The first cameras 260 may be configured to obtain an image from a subject. The first cameras 260 may be on the front surface of the housing 210. The first cameras 260 may be on both sides of the sensor 250. The first cameras 260 may include an image stabilizer actuator (not shown) and/or an autofocus actuator (not shown). For example, the first cameras 260 may include at least one or any combination of a camera configured to obtain a color image, a global shutter camera, and a rolling shutter camera. According to one embodiment, the first cameras 260 may selectively capture a surrounding environment of the user according to a command of the user. For example, when a closed mode command is received from the user, the first cameras 260 may be off. For example, when an open mode command is received from the user, the first cameras 260 may be on.

In an embodiment, the head-mounted electronic device 201 may include a plurality of second cameras 270 (e.g., the camera module 180 of FIG. 1). The second cameras 270 may be configured to recognize a subject. The second cameras 270 may be configured to detect and/or track a space or a 3-degrees of freedom (DoF) or 6-DoF object (e.g., a head or a hand of a human body). For example, the second cameras 270 may include a global shutter camera. The second cameras 270 may be configured to perform simultaneous localization and mapping (SLAM) by using depth information of the subject. The second cameras 270 may be configured to recognize a gesture of the subject. In an embodiment, the second cameras 270 may be on the front surface of the housing 210. In an embodiment, the second cameras 270 may be respectively on corner regions of the front surface of the housing 210.

In an embodiment, the head-mounted electronic device 201 may include a plurality of third cameras 280 (e.g., the camera module 180 of FIG. 1). The third cameras 280 may be configured to recognize a face of the user. For example, the third cameras 280 may be configured to detect and track a facial expression of the user.

In an embodiment, although not illustrated, the head-mounted electronic device 201 may include a processor (e.g., the processor 120 of FIG. 1). The processor may be included inside the housing 210. Alternatively, the processor may be included by temples (not shown) that are connected to the head-mounted electronic device 201 and configured to fix the head-mounted electronic device 201 to ahead of the user. The processor may be electrically and/or physically connected to the display 240, the sensor 250, the first camera 260, the second camera 270, and the third camera 280. The processor may control the display 240, the sensor 250, the first camera 260, the second camera 270, and the third camera 280. The processor may include at least one piece of hardware among a CPU, a microprocessor, a GPU, application-specific integrated circuits (ASICs), digital signal processors (DSPs), digital signal processing devices (DSPDs), programmable logic devices (PLDs), and field programmable gate arrays (FPGAs), but examples are not limited thereto.

In an embodiment that is not illustrated, the head-mounted electronic device 201 may include a microphone (e.g., the input module 150 of FIG. 1), a speaker (e.g., the sound output module 155 of FIG. 1), a battery (e.g., the battery 189 of FIG. 1), an antenna (e.g., the antenna module 197 of FIG. 1), a sensor (e.g., the sensor module 176 of FIG. 1), and/or other components suitable for the head-mounted electronic device 201. Further, the head-mounted electronic device 201 may include any of the software components and/or hardware components discussed for the electronic device 101.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to one embodiment, the electronic device is not limited to those described above.

It should be understood that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an ASIC.

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities, and some of the multiple entities may be separately disposed in different components. According to one embodiment, one or more of the above-described components may be omitted, or one or more other components may be added. Alternatively or additionally, a plurality of components (e.g., modules or programs) may be integrated into a single component. In such a case, according to one embodiment, the integrated component may still perform one or more functions of each of the components in the same or similar manner as they are performed by a corresponding one among the components before the integration. According to one embodiment, operations performed by the module, the program, or another component may be carried out sequentially, in parallel, repeatedly, or heuristically, or one or more of the operations may be executed in a different order or omitted, or one or more other operations may be added.

Hereinafter, embodiments will be described in detail with reference to the accompanying drawings. When describing the embodiments with reference to the accompanying drawings, like reference numerals refer to like elements and a repeated description related thereto will be omitted.

Figure 4:
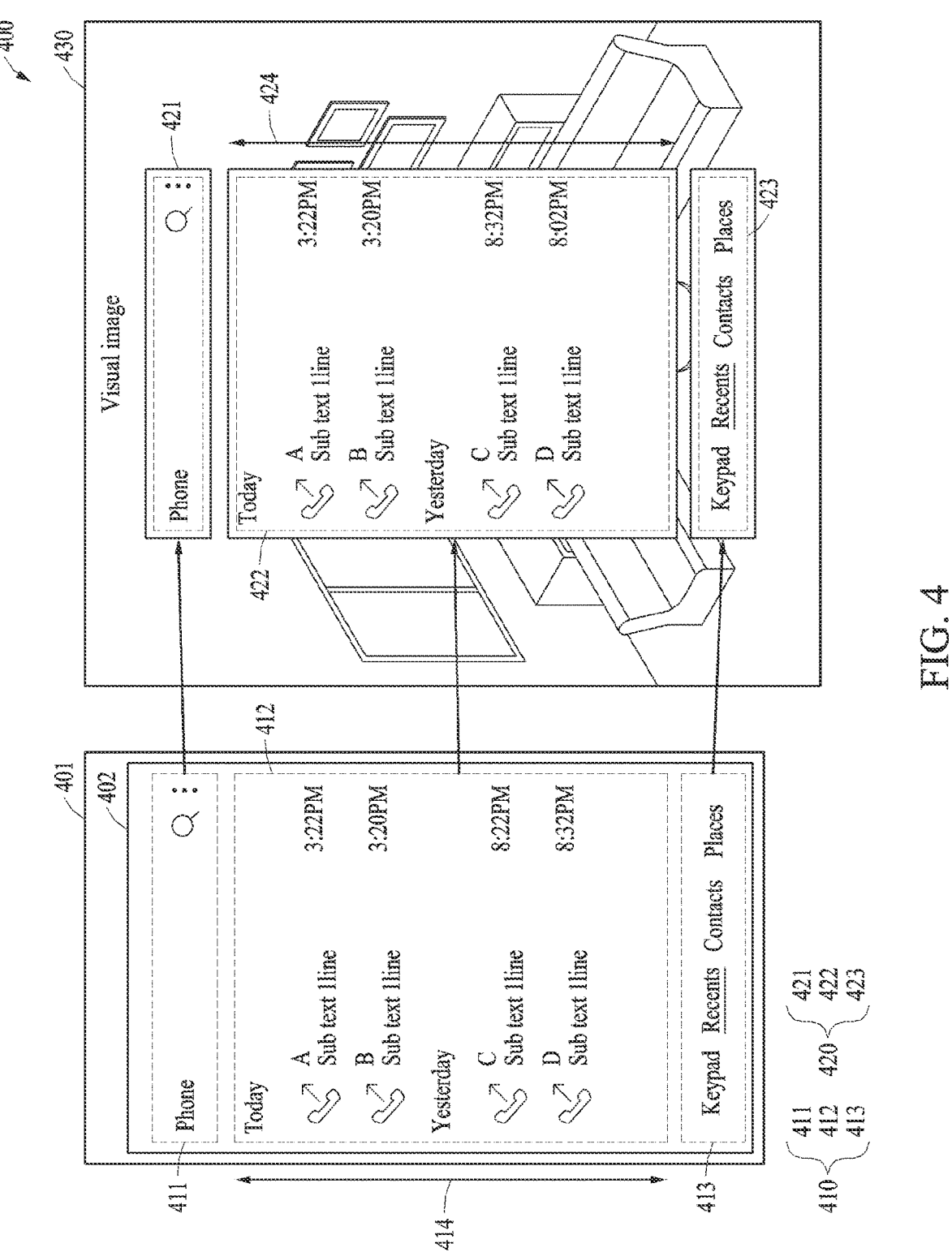
FIG. 4 is a diagram illustrating a method of converting a screen of an electronic device into an extended reality (XR) environment, according to one embodiment.

FIG. 4 is a diagram 400 illustrating a method of converting a screen of an electronic device into an extended reality (XR) environment, according to one embodiment.

Referring to FIG. 4, an electronic device 401 (e.g., the electronic device 102 or 104 of FIG. 1) and a visual image 430 are illustrated.

The electronic device 401 may include a display 402. The display 402 may display a screen. The display 402 may display an execution screen of an application being executed by the electronic device 401. Accordingly, the electronic device 401 may be a device including the display 402 controlled by a processor of the electronic device 401 to display the execution screen of the application.

The electronic device 401 may include, for example, various computing devices, such as a mobile phone, a smartphone, a tablet personal computer (PC), an e-book device, a laptop, a PC, a desktop, a workstation, or a server, various wearable devices, such as a smart watch, smart eyeglasses, or a head-mounted display (HMD), various home appliances such as a smart speaker, a smart television (TV), or a smart refrigerator, and other devices, such as a smart vehicle, a smart kiosk, an Internet of things (IoT) device, a walking assist device (WAD), a drone, or a robot.

The execution screen of the application may include a plurality of objects 410 that may be converted to be displayed in the visual image 430. A plurality of objects may be related to the execution screen of the application. The objects may display pieces of content related to the application.

According to one embodiment, the objects 410 may be related to the execution screen of the application and stored in a memory of the electronic device 401. The processor of the electronic device 401 may receive information including the objects 410 related to the execution screen of the application from the memory. The processor of the electronic device 401 may convert the objects 410 included by the received information into a plurality of virtual objects 420 to display the objects 410 as virtual objects 420 in the visual image 430. The objects 410 can be converted to virtual objects 420 using any known technology understood by one of ordinary skill in the art. In one or more embodiments, the processor can execute software configured to convert two-dimensional images into three-dimensional images, when converting the objects 410 to the virtual objects 420.

According to one embodiment, the objects 410 may be related to the execution screen of the application and included by the execution screen of the application. The processor of the electronic device 401 may separate the objects 410 from the execution screen of the application. The processor of the electronic device 401 may convert the separated objects 410 into a plurality of virtual objects 420 to display the separated objects 410 as the virtual objects 420 in the visual image 430.

According to one embodiment, the objects 410 may include a first object 411 displayed at the top of a screen. The objects 410 may include a second object 412 displayed in the middle of the screen. The objects 410 may include a third object 413 displayed at the bottom of the screen. For example, the execution screen of the application displayed by the electronic device 401 on the display 402 may be an execution screen of a call application. When executing the call application, a display may display a first object at the top, a second object at the middle, and a third object at the bottom, in which the first object may switch to a call log search or option screen, the second object may display a call log, and the third object may switch to a screen, such as a numeric keypad. The execution screen of the application displayed on the display 402 is just an example to describe the present disclosure, but examples are not limited thereto.

According to one embodiment, an object displayed on the electronic device 401 may include one or more detailed objects related to the object. According to one embodiment, a virtual object displayed on a head-mounted electronic device may include one or more detailed virtual objects related to the virtual object. For example, when the object is an object related to the call history of yesterday, the object may include a first detailed object displaying the call history of yesterday morning and a second detailed object displaying the call history of yesterday afternoon.

The head-mounted electronic device (e.g., the electronic device 101 of FIG. 1 and the head-mounted electronic device 201 of FIG. 2) may output the visual image 430 according to a command of a user. When the user wears temples (not shown) connectable to the head-mounted electronic device and puts their eyes in close contact with a lens structure (e.g., the lens structure 220 of FIG. 2), the head-mounted electronic device may provide the user with the visual image 430.

According to one embodiment, the visual image 430 may be a first visual image outputting a surrounding environment of the user captured by a camera (e.g., the camera module 180 of FIG. 1 and the first camera 260 of FIG. 2) included by the head-mounted electronic device. For example, the first visual image may be AR or VST. An AR or VST environment may be an operation of the first camera of FIG. 2 being on. When the user is outside a designated specific region in a VR environment, VST may be an experience showing an external environment in a direction that the user is heading to. For example, when the user is outside the specific region designated for safety or other reasons in the VR environment, the external environment captured by the first camera of FIG. 2 may be displayed on a display for safety.

According to one embodiment, the visual image 430 may be a second visual image outputting a virtual environment when the camera is off. For example, the second visual image may be VR.

The head-mounted electronic device may be connected to the electronic device 401 by wire or wirelessly. In this case, a processor (e.g., the processor 120 of FIG. 1) included by the head-mounted electronic device may determine whether the head-mounted electronic device is connected to the electronic device 401. According to one embodiment, the processor of the electronic device 401 may determine whether the head-mounted electronic device and the electronic device 401 are connected.

When the head-mounted electronic device 201 is connected to the electronic device 401 by wire or wirelessly, the processor of the head-mounted electronic device 201 may determine whether an application displaying the objects 410 that may be converted to be displayed in the visual image 430 is being executed in the electronic device 401. According to one embodiment, the processor of the electronic device 401 may determine whether the application displaying the objects 410 that may be converted to be displayed in the visual image 430 is being executed in the electronic device 401. A communication module (e.g., the communication module 190 of FIG. 1) of the head-mounted electronic device 201 and a communication module (e.g., the communication module 190 of FIG. 1) of the electronic device 401 can be communicatively coupled together in order to transfer data and perform operations as discussed herein.

If the objects 410 are not being converted to be displayed in the visual image 430, the processor of the head-mounted electronic device may allow a display (e.g., the display module 160 of FIG. 1 and the display 240 of FIG. 2) of the head-mounted electronic device to simply mirror a screen of the electronic device 401. According to one embodiment, when the objects 410 are not being converted to be displayed in the visual image 430, the processor of the electronic device 401 may allow the display of the head-mounted electronic device to simply mirror the electronic device 401.

The processor of the head-mounted electronic device may convert the objects 410 included by information received from the electronic device 401 into the virtual objects 420 to display the objects 410 as the virtual objects 420 in the visual image 430. According to one embodiment, the processor of the electronic device 401 may convert the objects 410 by using information received from the memory of the electronic device 401 into the virtual objects 420 to display the objects 410 as the virtual objects 420 in the visual image 430. For example, the first object 411 may be converted into a first virtual object 421. The second object 412 may be converted into a second virtual object 422. The third object 413 may be converted into a third virtual object 423.

According to one embodiment, the virtual objects 420 may be displayed in a region desired by the user in the visual image 430. For example, when the user selects a region beside a specific object displayed in the visual image 430, the virtual objects 420 may be displayed in the selected region.

According to one embodiment, the processor of the head-mounted electronic device may arrange the virtual objects 420 in the visual image 430 based on an arrangement of the objects 410. The virtual objects 420 may be arranged in the visual image 430 according to an arrangement order of the objects 410. According to one embodiment, the processor of the electronic device may arrange the virtual objects 420 in the visual image 430 based on an arrangement of the objects 410. The virtual objects 420 may be arranged in the visual image 430 according to an arrangement order of the objects 410. For example, the first virtual object 421, the second virtual object 422, and the third virtual object 423 may be arranged in the visual image 430 according to an arrangement order of the first object 411 corresponding to the first virtual object 421, the second object 412 corresponding to the second virtual object 422, and the third object 413 corresponding to the third virtual object 423.

According to one embodiment, the virtual objects 420 may be arranged in the visual image 430 of the head-mounted electronic device in the same arrangement as an arrangement of the objects 410 having the same name. For example, referring to FIG. 4, the first object 411, the second object 412, and the third object 413 may be arranged in an order from top to bottom. Because the first object 411 and the first virtual object 421 may have the same name of an APP bar, the first virtual object 421 may be arranged in the same arrangement as an arrangement of the first object 411.

According to one embodiment, the virtual objects 420 of the head-mounted electronic device may perform all operations that may be performed by the objects 410. For example, when the user selects a search icon in the first virtual object 421, the same event may occur as an event that occurs when the user selects a search icon of the first object 411 in the electronic device 401. According to one embodiment, the second object 412 may be a scrollable element. The top to bottom of the second object 412 may be a scroll region 414. For example, when the user scrolls up a screen displaying the second object 412, pieces of information that may not be displayed due to the size of the screen may be displayed while being scrolled up. Accordingly, the second virtual object 422 having the same name as a name of the second object 412 may be a scrollable object in a scroll region 424.

The virtual objects 420 of the head-mounted electronic device may be displayed by floating in the visual image 430 such that the user may have an impression that the virtual objects 420 float in a space. For example, the virtual objects 420 in the visual image 430 may appear to float in a room. In addition, the user may experience a consistent user experience (UX) because the virtual objects 420 are displayed through a similar interface to a UX of the electronic device 401. In addition, regardless of the type of the electronic device 401 connecting to the head-mounted electronic device, the user may be provided a consistent connection regardless of the type of a terminal if an application displaying an object that may be converted to be displayed in the visual image 430 may be executed by the electronic device 401.

The camera and display of the head-mounted electronic device herein may be controlled by the processor of the head-mounted electronic device or the processor of the electronic device 401. In addition, the virtual objects 420 herein may be converted and controlled by the processor of the head-mounted electronic device or the processor of the electronic device. The operations described herein may be performed or controlled by the processor of the head-mounted electronic device or the processor of the electronic device. In addition, even when not explicitly described, the operations described herein may be performed or controlled by the processor of the head-mounted electronic device or the processor of the electronic device.

Hereinafter, a UX that may be converted to be displayed in a visual image is described.

Figure 5:
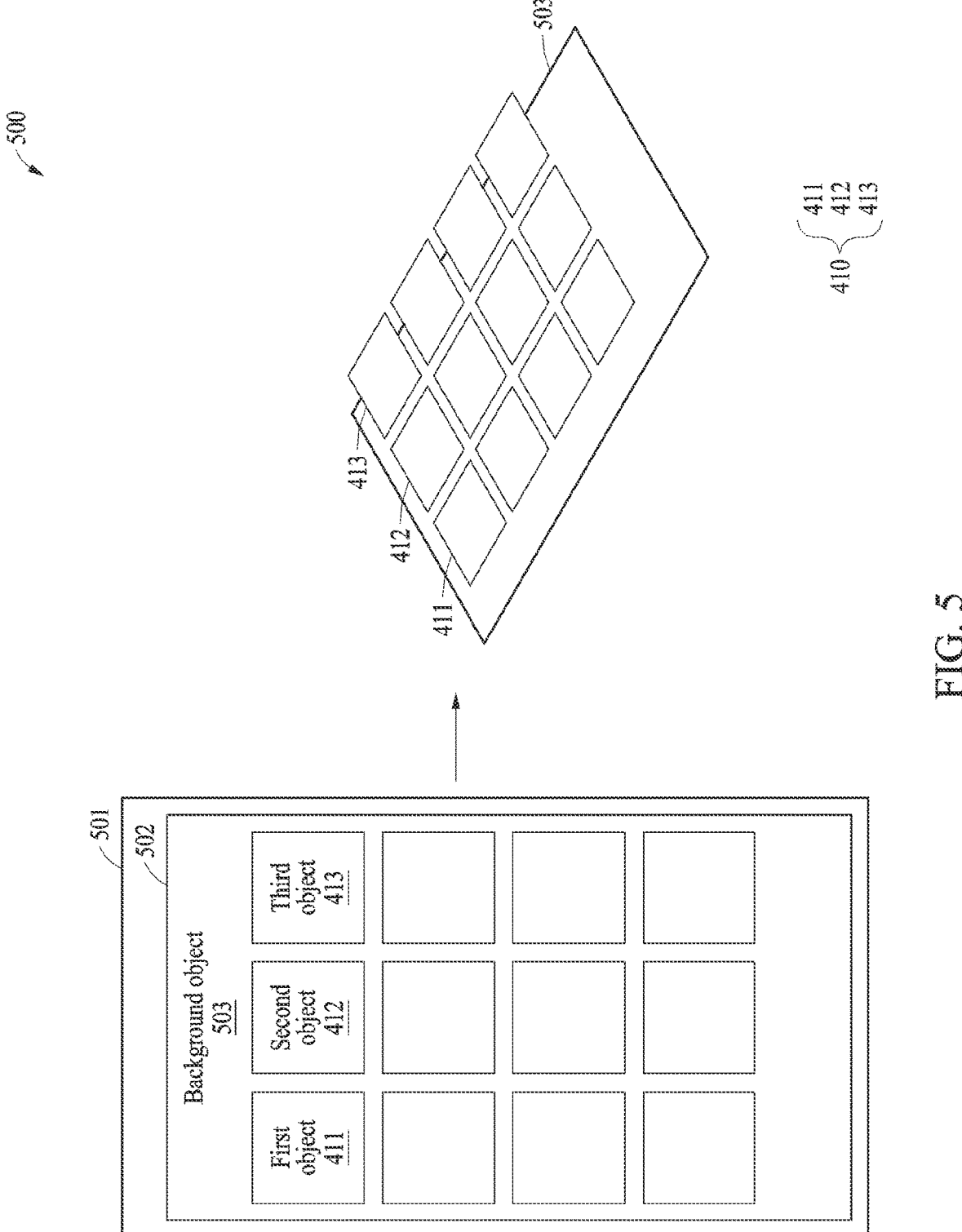
FIG. 5 is a diagram illustrating an execution screen of an application according to one embodiment.

FIG. 5 is a diagram 500 illustrating an execution screen of an application according to one embodiment.

Referring to FIG. 5, an electronic device 501 (e.g., the electronic device 102 or 104 of FIG. 1 or the electronic device 401 of FIG. 4) for displaying an execution screen of an application including a plurality of objects 410 that may be converted for display in an XR environment is illustrated.

The electronic device 501 may include a display 502 (e.g., the display 402 of FIG. 4). The display 502 may display the execution screen of the application including the objects 410 that may be converted to be used in VR, AR, and VST environments.

According to one embodiment, when the electronic device 501 displays the objects 410 that may be converted to be used in an XR environment, a head-mounted electronic device (e.g., the electronic device 101 of FIG. 1 and the head-mounted electronic device 201 of FIG. 2) may simply mirror and display a screen of the electronic device 501. According to one embodiment, when the electronic device 501 displays the objects 410 that may be converted to be used in an XR environment, the head-mounted electronic device may convert the objects 410 included by a user interface into a plurality of virtual objects (e.g., the virtual objects 420 of FIG. 4) provided to a user in the XR environment and display the virtual objects. Accordingly, the user may experience a consistent UX. A communication module (e.g., the communication module 190 of FIG. 1) of the head-mounted electronic device 201 and a communication module (e.g., the communication module 190 of FIG. 1) of the electronic device 501 can be communicatively coupled together in order to transfer data and perform operations as discussed herein.

The execution screen of the application may include a background object 503 included by a background and the objects 410 that are arranged on the background object 503. For example, the objects 410 may include a first object 411, a second object 412, and a third object 413.

According to one embodiment, the execution screen of the application may display the objects 410 related to the execution screen of the application, the objects 410 may display pieces of content related to the application.

The objects 410 that enable communication between the user and the electronic device 501 may be named in advance. Each of the objects 410 may have different names. An object may group and display pieces of content for the application related to the object. For example, when the first object 411 is related to the application for displaying things to do, the first object 411 may display pieces of content related to the application for displaying things to do.

According to one embodiment, each of the objects 410 may display pieces of content that are grouped by different criteria. According to one embodiment, pieces of content included by the same object may be pieces of content that are grouped by the same criterion. Accordingly, pieces of content included by different objects may be pieces of content grouped by different criteria.

According to one embodiment, the pieces of content included by the same object may be grouped again into a plurality of detailed objects and displayed. The pieces of content included by the same object may be grouped into the detailed objects by sub-criteria. For example, pieces of content included by a call history that is the same object may be grouped into a plurality of detailed objects by date criteria that are sub-criteria and be displayed.

Because each of a plurality of virtual objects (e.g., the virtual objects 420 of FIG. 4) is a virtual object into which the objects 410 have been converted to be displayed in a visual image (e.g., the visual image 430 of FIG. 4), all the descriptions of the objects 410 provided above may be applicable thereto.

According to one embodiment, the virtual objects that enable communication between the user and the electronic device 501 may be named in advance. Each of the virtual objects may have different names.

According to one embodiment, each of the virtual objects may display pieces of content that are grouped by different criteria. According to one embodiment, pieces of content included by the same virtual object may be pieces of content that are grouped by the same criterion. Accordingly, pieces of content included by different virtual objects may be pieces of content grouped by different criteria.

According to one embodiment, the pieces of content included by the same virtual object may be grouped again into a plurality of detailed virtual objects and displayed. The pieces of content included by the same virtual object may be grouped into the detailed objects by sub-criteria.

Hereinafter, examples of the objects 410 being converted into the virtual objects and displayed in the visual image are described.

Figures 6A, 6B:
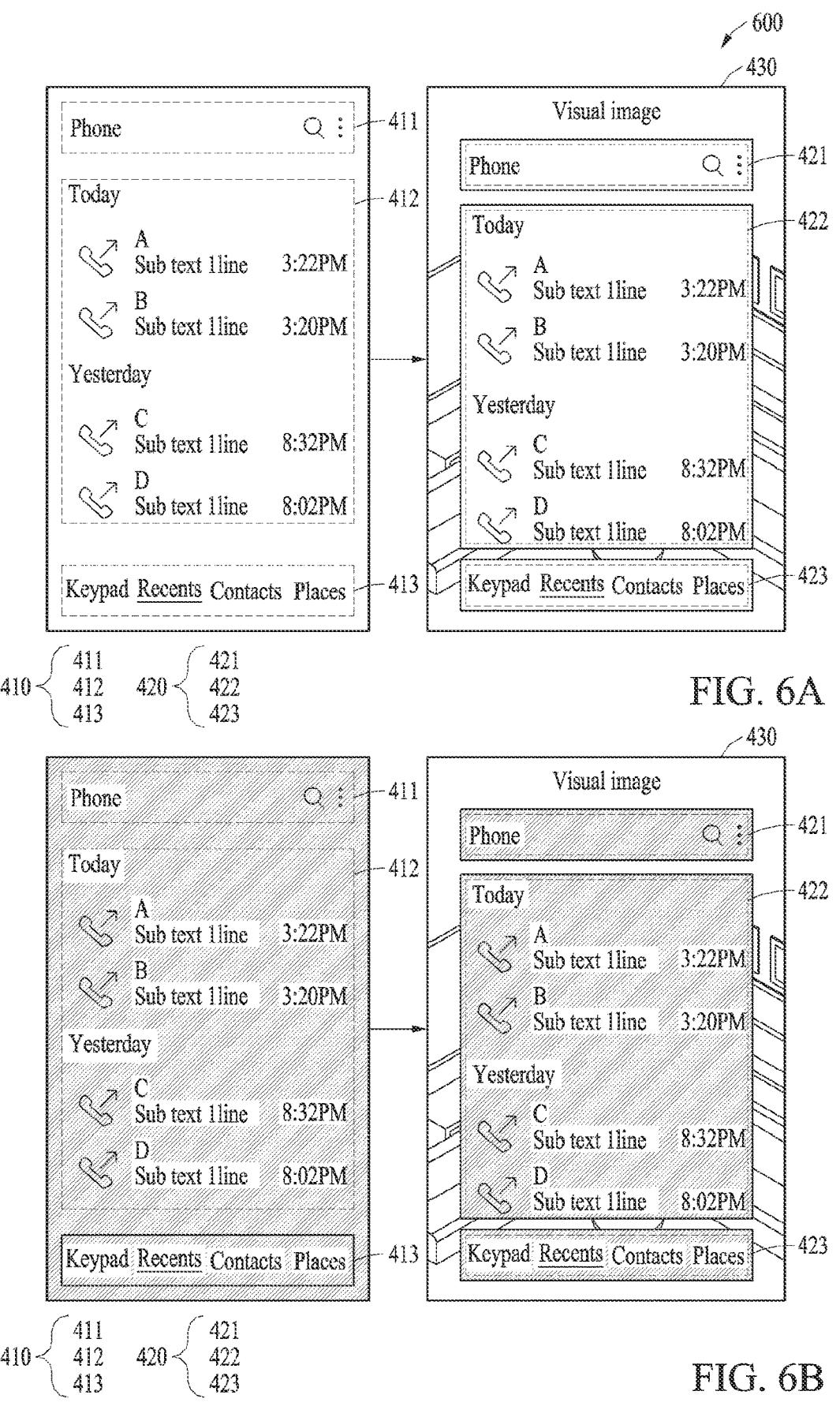
FIG. 6A and FIG. 6B is a diagram illustrating conversion into an XR environment according to a theme corresponding to a color of an execution screen of an application, according to one embodiment.

FIG. 6A and FIG. 6B is a diagram 600 illustrating conversion into an XR environment according to a theme corresponding to a color of an execution screen of an application, according to one embodiment.

FIG. 6A is a diagram illustrating a plurality of objects 410 being converted into a plurality of virtual objects 420 when the theme corresponding to the color of the execution screen of the application displayed on a screen of an electronic device (e.g., the electronic device 102 or 104 of FIG. 1, the electronic device 401 of FIG. 4, and the electronic device 501 of FIG. 5) is a light theme. FIG. 6B is a diagram illustrating the objects 410 being converted into the virtual objects 420 when the theme corresponding to the color of the execution screen of the application displayed on the screen of the electronic device is a dark theme.

According to one embodiment, the light theme may be a brightness of the theme being greater than or equal to a first threshold value. The dark theme may be the brightness of the theme being greater than or equal to a second threshold value. The first threshold value and the second threshold value may be the same or different.

Referring to FIG. 6A, a first object 411, a second object 412, and a third object 413 are illustrated. The first object 411, the second object 412, and the third object 413 may be objects to which the light theme is applied. The theme of the virtual objects 420, into which the objects 410 are converted, in a visual image 430 may be determined based on the theme of the objects 410. For example, since the theme of the objects 410 is the light theme, the theme of the virtual objects 420 may be determined to be the light theme.

Referring to FIG. 6B, the first object 411, the second object 412, and the third object 413 are illustrated. The first object 411, the second object 412, and the third object 413 may be objects to which the dark theme is applied. The theme of the virtual objects 420, into which the objects 410 are converted, in a visual image 430 may be determined based on the theme of the objects 410. For example, since the theme of the objects 410 is the dark theme, the theme of the virtual objects 420 may be determined to be the light theme.

According to one embodiment, a processor (e.g., the processor 120 of FIG. 1) of a head-mounted electronic device (e.g., the electronic device 101 of FIG. 1 and the head-mounted electronic device 201 of FIG. 2) may verify information on the theme corresponding to the color of the execution screen of the application. The processor of the head-mounted electronic device may determine the theme of the virtual objects 420 based on the information on the theme. The processor of the head-mounted electronic device may determine the theme of the virtual objects 420 to be the same theme as the theme of the objects 410.

According to one embodiment, a processor of an electronic device may verify the information on the theme corresponding to the color of the execution screen of the application. The processor of the electronic device may determine the theme of the virtual objects 420 based on the information on the theme. The processor of the electronic device may determine the theme of the virtual objects 420 to be the same theme as the theme of the objects 410. In this present disclosure, the information on the theme corresponding to the color of the execution screen of the application may be referred to as first information in order to be distinguished from an information on visual image described in FIG. 7.

Although the description is provided based on the light theme and the dark theme with reference to FIG. 6A and FIG. 6B, the description may not be limited thereto and may be applied to a colored theme. Verifying the theme can include checking the information of the theme corresponding to the color of the execution screen of the application to determine, for example, values/settings for brightness, saturation, color (e.g., RGB), contrast, etc. Verifying or determining the theme of the virtual objects for the visual image can include checking the values/settings for brightness, saturation, color (e.g., RGB), contrast, etc., of the visual image containing the virtual objects. In one or more embodiments, the processor of the electronic device and/or the processor of the head-mounted electronic device can cause the theme of the virtual objects to match or nearly match the values/settings for the theme corresponding to the color of the execution screen of the application. In one or more embodiments, the processor of the electronic device and/or the processor of the head-mounted electronic device can cause the theme of the virtual objects to be opposite in appearance (e.g., a light theme versus a dark theme, or vice versa) to the values/settings for the theme corresponding to the color of the execution screen of the application.

Hereinafter, a method of controlling the color of virtual objects by the electronic device and the head-mounted electronic device according to the type of the visual image 430 is described.

Figure 7:
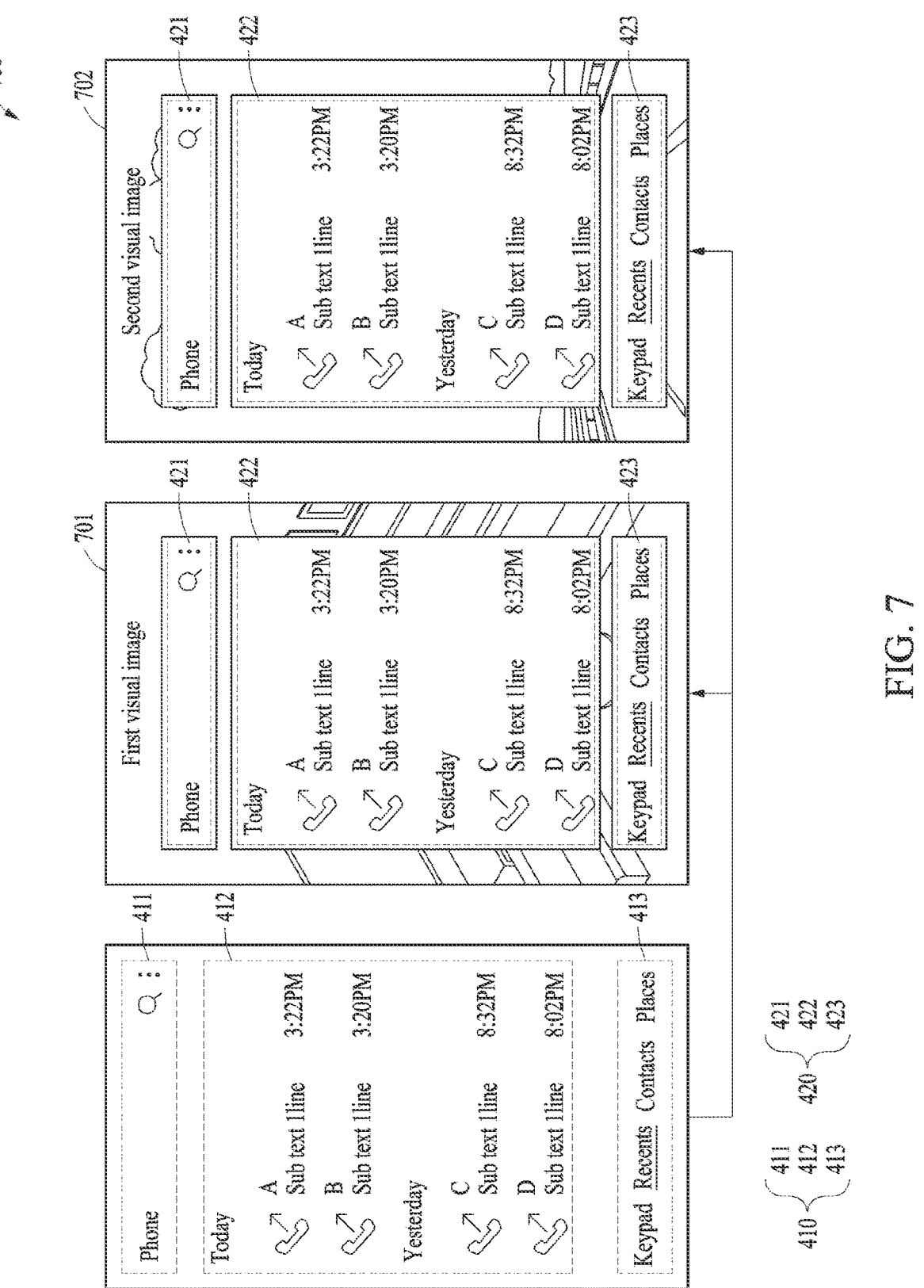
FIG. 7 is a diagram illustrating a method of converting screens of an electronic device respectively to different visual images, according to one embodiment.

FIG. 7 is a diagram 700 illustrating a method of converting screens of an electronic device respectively to different visual images, according to one embodiment.

Referring to FIG. 7, a first object 411, a second object 412, and a third object 413 are illustrated on a screen of the electronic device (e.g., the electronic device 102 or 104 of FIG. 1, the electronic device 401 of FIG. 4, and the electronic device 501 of FIG. 5).

A plurality of objects 410 may be converted into a plurality of virtual objects 420 to be displayed in a visual image (e.g., the visual image 430 of FIG. 4). The converted virtual objects 420 may be arranged in the visual image.

In this case, the visual image may be one or a combination of two or more of AR, VST, and VR environments. Accordingly, a head-mounted electronic device (e.g., the electronic device 102 of FIG. 1 and the head-mounted electronic device 201 of FIG. 2) may be interfered with by light in the AR and VST environments, unlike the electronic device. Accordingly, visibility may decrease when the virtual objects 420 are displayed with the same brightness, saturation, and other properties as those of the screen of the electronic device. The information on the visual image may relate to whether the visual image displayed by the head-mounted electronic device is one or a combination of two or more of AR, VST, and VR environments. In this present disclosure, the information on the visual image may be referred to as second information in order to be distinguished from the information on the theme corresponding to the color of the execution screen of the application described in FIG. 6A and FIG. 6B.

First, an example of displaying virtual objects in a first visual image 701 of the head-mounted electronic device, that is, the AR or VST environment in which an image capturing a surrounding environment of a user is displayed, is described.

A first virtual object 421, a second virtual object 422, and a third virtual object 423 may be objects into which the objects 410 are respectively converted to be displayed in the first visual image 701 of the head-mounted electronic device.

According to one embodiment, a processor of the electronic device may identify an arrangement of the objects 410. The processor of the electronic device may arrange the virtual objects 420 to correspond to the arrangement of the objects 410 on a display (e.g., the display module 160 of FIG. 1 and the display 240 of FIG. 2) of the head-mounted electronic device.

According to one embodiment, a processor of the head-mounted electronic device may identify the arrangement of the objects 410. The processor of the head-mounted electronic device may arrange the virtual objects 420 to correspond to the arrangement of the objects 410 on the display of the head-mounted electronic device.

For example, the first virtual object 421, the second virtual object 422, and the third virtual object 423 may be arranged in the first visual image 701 to correspond to the arrangement of the objects 410.

According to one embodiment, the processor of the electronic device may arrange the virtual objects 420 in the same arrangement as an arrangement on the screen of the electronic device of an object having the same name as the virtual objects 420 in a visual image displayed by the display of the head-mounted electronic device.

According to one embodiment, the processor of the head-mounted electronic device may arrange the virtual objects 420 in the same arrangement as the arrangement in the screen of the electronic device of the object having the same name as the virtual objects 420 in the visual image displayed by the display of the head-mounted electronic device.

For example, the first virtual object 421, the second virtual object 422, and the third virtual object 423 may be arranged in the first visual image 701 of the head-mounted electronic device in the same arrangement as the arrangement in the screen of the electronic device of the objects 410 having the same name as the virtual objects 420.

In this case, a theme of the virtual objects 420 may be determined based on a theme corresponding to a color of an execution screen of an application. When the virtual objects 420 are arranged in the first visual image 701 of the head-mounted electronic device, visibility may decrease according to the interference of light. Accordingly, the color of objects may be adjusted for visibility. The color may be determined based on hue, brightness, and saturation.

According to one embodiment, the processor (e.g., the processor 120 of FIG. 1) of the head-mounted electronic device or the processor of the electronic device may control the color of the virtual objects 420. The processor of the head-mounted electronic device or the processor of the electronic device may control at least one or a combination of a brightness and saturation of the virtual objects 420.

According to one embodiment, the processor of the head-mounted electronic device or the processor of the electronic device may increase or decrease at least one of the brightness and saturation of the virtual objects 420 by N %. The processor of the head-mounted electronic device or the processor of the electronic device may increase or decrease each of the brightness and saturation of the virtual objects 420 by N %.

According to one embodiment, when the virtual objects 420 need to be displayed in the first visual image 701 regardless of the theme of the virtual objects 420, the processor of the head-mounted electronic device or the processor of the electronic device may increase or decrease at least one or a combination of the brightness and saturation of the virtual objects 420 by N %.

According to one embodiment, the processor of the head-mounted electronic device or the processor of the electronic device may control the brightness and the saturation according to the theme of the virtual objects 420. The processor of the head-mounted electronic device or the processor of the electronic device may increase the saturation by N % and increase the brightness by N % when the theme of the virtual objects 420 is a light theme. The processor of the head-mounted electronic device or the processor of the electronic device may increase the saturation by N % and decrease the brightness by N % when the theme of the virtual objects 420 is a dark theme.

For example, when the visual image is the first visual image 701, the processor of the head-mounted electronic device or the processor of the electronic device may increase the brightness by 10% and increase the saturation by 10% for objects in the light theme. When the visual image is the first visual image 701, the processor of the head-mounted electronic device or the processor of the electronic device may decrease the brightness by 10% and increase the saturation by 10% for objects in the dark theme.

Hereinafter, an example of displaying virtual objects in a second visual image 702 of the head-mounted electronic device, that is, the VR environment outputting a virtual environment, is described. Since the VR environment displays the virtual environment, for example, a space including computer graphics, the VR environment may not be interfered with by light, unlike the AR or VST environment.

Accordingly, the color of the first virtual object 421, the second virtual object 422, and the third virtual object 423 that are arranged in the second visual image 702 may not be controlled or changed from the original color. The processor of the head-mounted electronic device or the processor of the electronic device may display the virtual objects 420 in the second visual image 702 with the same brightness and saturation as those of an object on the screen of the electronic device. That is, a set value of the electronic device may be displayed in the second visual image 702 as it is original displayed for the electronic device.

Hereinafter, the size of a font and the size of an object included by the objects 410 when converting the objects 410 into the virtual objects 420 are described.

Figure 8:
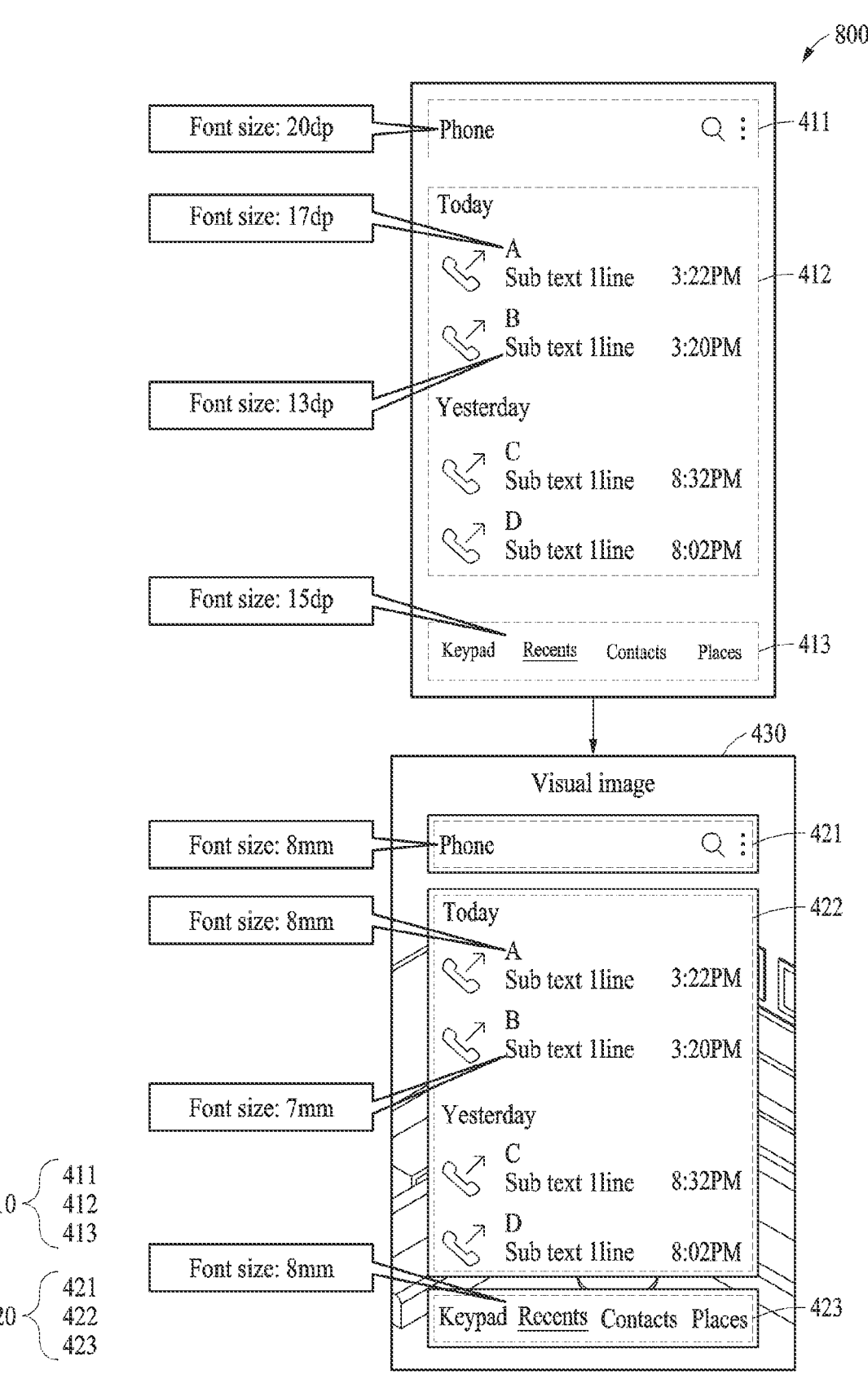
FIG. 8 is a diagram illustrating a method of converting a size of a font according to one embodiment.

FIG. 8 is a diagram 800 illustrating a method of converting the size of a font and the size of an object, according to one embodiment.

Referring to FIG. 8, the font size of a first object 411 may be 20 density-independent pixels (dp). The font size of a second object 412 may be 17 dp and 13 dp. The font size of a third object 413 may be 15 dp.

A unit of a font size in an electronic device (e.g., the electronic device 102 or 104 of FIG. 1, the electronic device 401 of FIG. 4, and the electronic device 501 of FIG. 5) may be dp. The dp may be a unit based on a physical density of a screen. However, because a subject may be expressed in AR, VST, and VR environments at the same ratio as that of the subject in the real world, the unit based on the physical density may be irrelevant. Accordingly, a processor (e.g., the processor 120 of FIG. 1) of a head-mounted electronic device may convert dp, that is, a unit of a font included by objects, into a millimeter (mm), that is, a unit of a font included by virtual objects. According to one embodiment, a processor of the electronic device may convert dp, that is, the unit of the font included by the objects, into mm, that is, the unit of the font included by the virtual objects.

For example, the processor of the electronic device may convert 20 dp that is the size of the font of the first object 411 into 8 mm in a first virtual object 421 in a visual image 430 of the head-mounted electronic device. The processor of the electronic device may respectively convert 17 dp and 13 dp that are the size of the font of the second object 412 into 8 mm and 7 mm in a second virtual object 422 in the visual image 430. The processor of the electronic device may convert 15 dp that is the size of the font of the third object 413 into 8 mm in a third virtual object 423 in the visual image 430.

In addition, according to one embodiment, the processor of the head-mounted electronic device or the processor of the electronic device may convert the size of virtual objects and the size of a font included by the virtual objects based on the size of the visual image 430 provided to a user. The visual image 430 may be one of the VR, AR, and VST environments displayed on the head-mounted electronic device. Accordingly, the visual image 430 may provide a 3D space experience to the user. In this case, when the virtual objects are output in the VR, AR, and VST environments as they are the same size on a screen of the electronic device, visibility may decrease because the size is small. For example, when the user desires to float a plurality of virtual objects 420 in a space relatively far in the visual image 430 and floats the virtual objects 420 with the same size as the screen size of the electronic device, the size of the virtual objects 420 may be too small to be seen.

According to one embodiment, the processor of the head-mounted electronic device may increase or decrease the size of objects in proportion to a distance from the user to a region of the visual image 430 including the virtual objects 420. The processor of the head-mounted electronic device may increase or decrease the size of a font included by a virtual object in proportion to the distance from the user to the region of the visual image 430 including the virtual objects 420.

According to one embodiment, the processor of the electronic device may increase or decrease the size of virtual objects in proportion to the distance from the user to the region of the visual image 430 including the virtual objects 420. The processor of the electronic device may increase or decrease the size of a font included by a virtual object in proportion to the distance from the user to the region of the visual image 430 including the virtual objects 420.

According to one embodiment, the color of a font included by a plurality of objects 410 may be applied to the color of a font included by the virtual objects 420. When a gradation is applied to the font included by the objects 410, the gradation may also be applied to the font included by the virtual objects 420. In this case, the rule applied to the gradation applied to the objects 410 may be applied to the virtual objects 420 as it is.

Hereinafter, a perceptional depth according to a depth between virtual objects is described.

Figure 9:
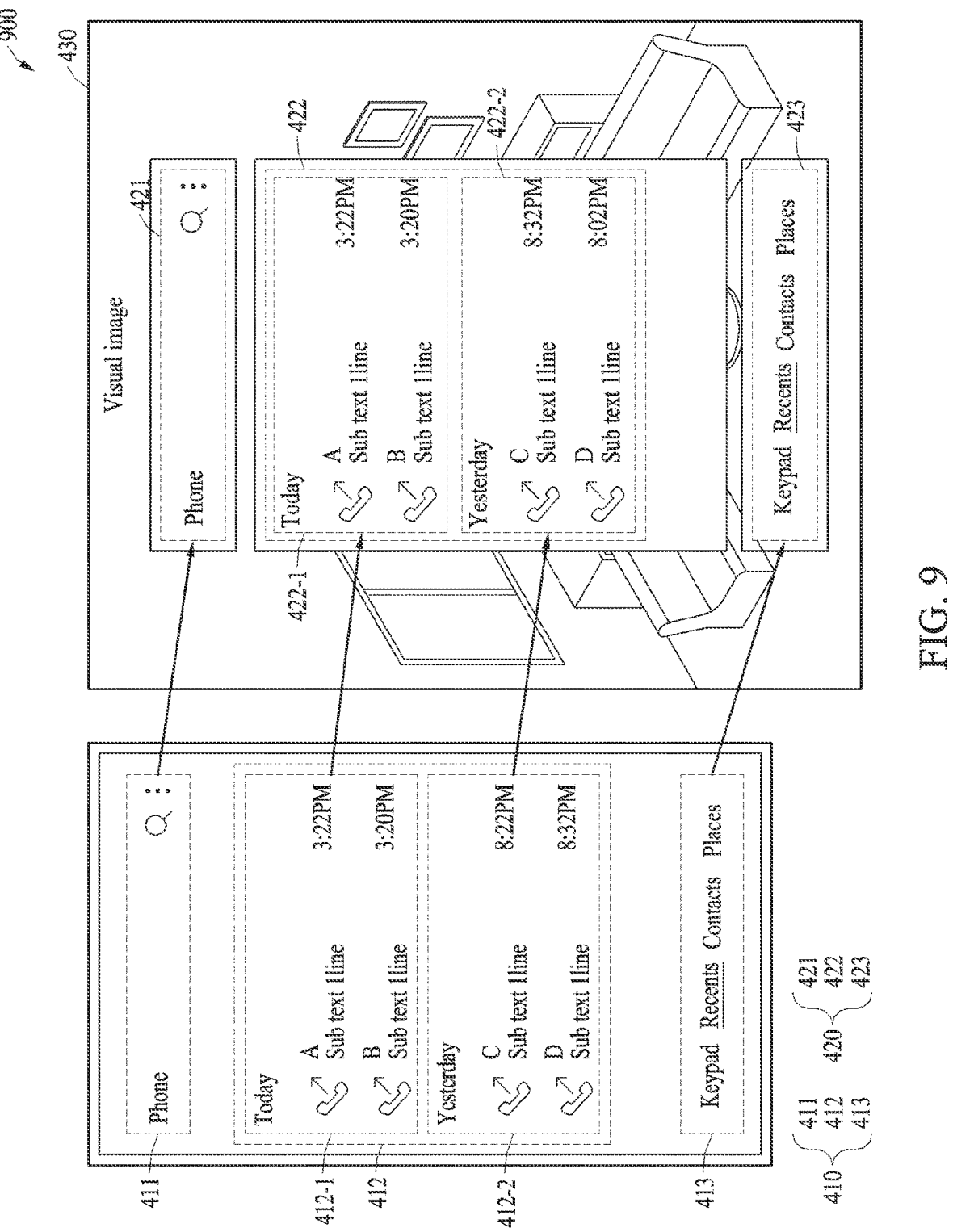
FIG. 9 is a diagram illustrating an object identified by depth according to one embodiment.

FIG. 9 is a diagram 900 illustrating an object identified by depth according to one embodiment.

Referring to FIG. 9, a first object 411, a second object 412, and a third object 413 are illustrated on a screen of an electronic device (e.g., the electronic device 102 or 104 of FIG. 1, the electronic device 401 of FIG. 4, and the electronic device 501 of FIG. 5).

The second object 412 may include a background object (e.g., the background object 503 of FIG. 5) of the second object 412 and a first detailed object 412-1, and a second detailed object 412-2. The first detailed object 412-1 and the second detailed object 412-2 may include pieces of content grouped based on different criteria. For example, the first detailed object 412-1 may include pieces of content grouped based on today's call transmission and reception history. For example, the second detailed object 412-2 may include pieces of content grouped based on yesterday's call transmission and reception history.

The first detailed object 412-1 and the second detailed object 412-2 may be on the background object of the second object 412. Accordingly, in a plurality of virtual objects 420 and a plurality of detailed virtual objects 422-1 and 422-2 respectively converted from a plurality of objects 410 and a plurality of detailed objects 412-1 and 412-2, a first detailed virtual object 422-1 and a second detailed virtual object 422-2 may be on a background virtual object of a second virtual object 422. According to one embodiment, each of the virtual objects may be identified by another virtual object and a depth. For example, the background virtual object, the first detailed virtual object 422-1, and the second detailed virtual object 422-2 may be distinguished by a perceptional depth on the head-mounted electronic device.

For example, by generating a shadow at the bottom of the first detailed virtual object 422-1 and the second detailed virtual object 422-2, a perceptional depth may be generated as if the first detailed virtual object 422-1 and the second detailed virtual object 422-2 are arranged on the background virtual object of the head-mounted electronic device. Alternatively, by floating the first detailed virtual object 422-1 and the second detailed virtual object 422-2 before the background virtual object in a visual image 430, they may be arranged in different depths in a direction viewed by a user of the head-mounted electronic device.

In the descriptions above, the virtual objects 420 may be controlled and arranged by a processor (e.g., the processor 120 of FIG. 1) of a head-mounted electronic device (e.g., the electronic device 101 of FIG. 1 and the head-mounted electronic device 201 of FIG. 2) or a processor of the electronic device (e.g., the electronic device 102 or 104 of FIG. 1, the electronic device 401 of FIG. 4, and the electronic device 501 of FIG. 5).

Accordingly, the user may experience a cubic effect or a three-dimensional effect in the visual image 430 through a perceptional depth.

Figure 10:
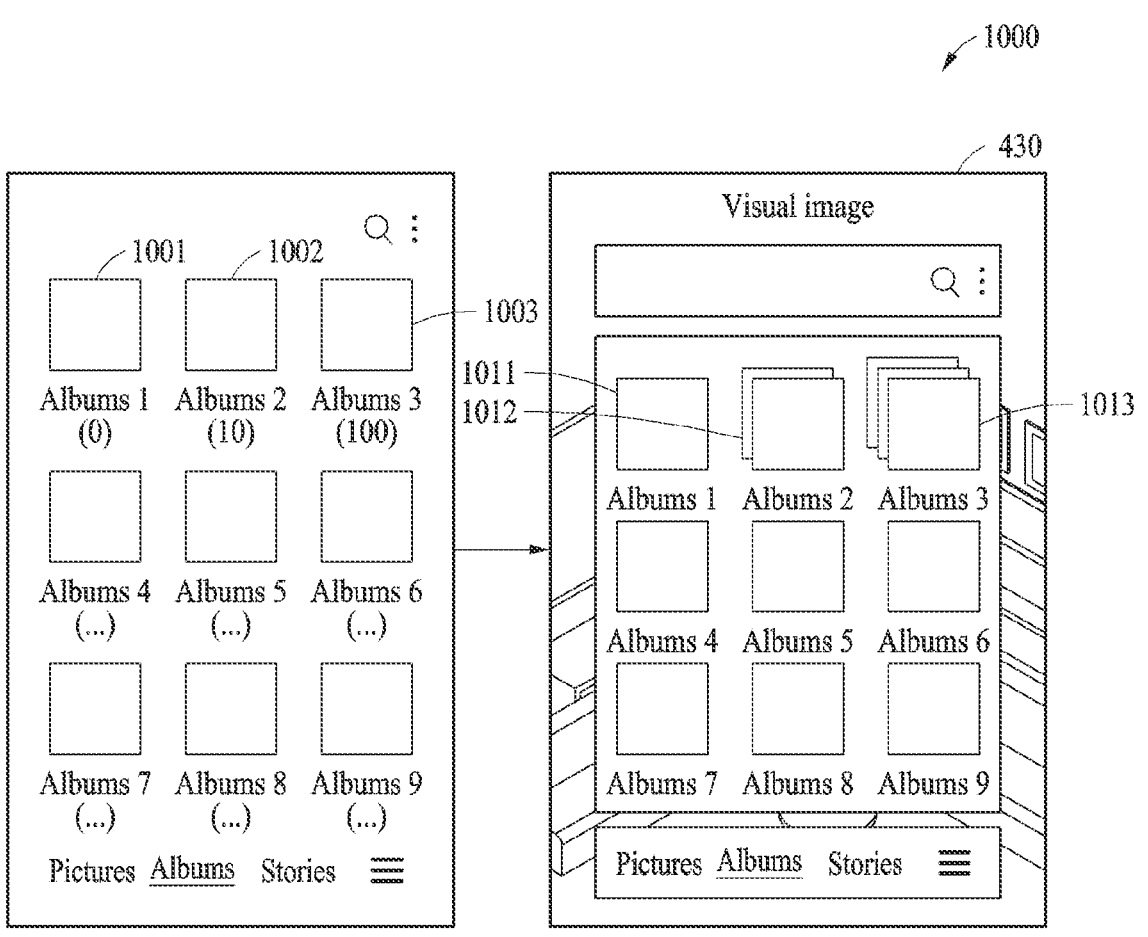
FIG. 10 is a diagram illustrating an object identified by depth by a layer according to one embodiment.

FIG. 10 is a diagram 1000 illustrating an object identified by depth by a layer according to one embodiment.

Referring to FIG. 10, a plurality of album folders 1001, 1002, and 1003 in a screen of an electronic device (e.g., the electronic device 102 or 104 of FIG. 1, the electronic device 401 of FIG. 4, and the electronic device 501 of FIG. 5) are illustrated. In an embodiment, the album folders 1001, 1002, and 1003 may be an example of a plurality of objects (e.g., the objects 410 of FIG. 4) storing a photo, an image, a video, or other content.

An album folder 1 1001, an album folder 2 1002, and an album folder 3 1003 may each include content that is grouped by different criteria. For example, the album folder 1 1001 may be a location where a photo captured by a user is automatically stored. The album folder 2 1002 may be a location where a video captured by the user is automatically stored.

Referring to FIG. 10, the album folder 1 1001 may store 0 pieces of content. The album folder 2 1002 may store 10 pieces of content. The album folder 3 1003 may store 100 pieces of content.

The album folders 1001, 1002, and 1003 may be converted into a plurality of virtual album objects 1011, 1012, and 1013 to be displayed in a visual image 430 on the head-mounted electronic device.

According to one embodiment, when the virtual album objects 1011, 1012, and 1013 include one or more pieces of content, a layer displayed by overlapping with a virtual album object may be added. Each layer can be representative of a piece of content in the virtual album object. For example, the number of layers of a first virtual album object 1011 may be 1. The number of layers of a second virtual album object 1012 may be 2. The number of layers of a third virtual album object 1013 may be 3. The virtual album objects 1011, 1012, and 1013 may express a perceptional depth by layers on the head-mounted electronic device, even when no perceptual depth of layers is displayed for the album folder 1 1001, the album folder 2 1002, and the album folder 3 1003, respectively, on the electronic device (e.g., the electronic device 102 or 104 of FIG. 1, the electronic device 401 of FIG. 4, and the electronic device 501 of FIG. 5). The user may intuitively recognize the number of pieces of content stored in an object according to the number of layers of virtual album objects 1011, 1012, and 1013 on the head-mounted electronic device. In one or more embodiments, the number of layers in a virtual album object may be equivalent to the number of the pieces of content. In one or more embodiments, when the number of pieces of content is numerous, the number of layers may illustrate numerous layers but may be less than the (actual) number of pieces of content.

According to one embodiment, a processor of a head-mounted electronic device (e.g., the electronic device 101 of FIG. 1 and the head-mounted electronic device 201 of FIG. 2) may generate a perceptional depth by adding a layer when the number of pieces of content included by a virtual object is two or more. The electronic device transfers data to the head-mounted electronic device where the data indicates the number of pieces of content of an object that is converted to a virtual object. Every time the number of pieces of content included by the virtual object exceeds a threshold value set for each section, the processor of the head-mounted electronic device may add a layer.

According to one embodiment, a processor of the electronic device may generate a perceptional depth by adding a layer when the number of pieces of content included by the virtual object is two or more. Every time the number of pieces of content included by the virtual object exceeds a threshold value set for each section, the processor of the electronic device may add a layer. Accordingly, virtual objects may be identified from another object through a perceptional depth generated by the added layer.

Although the virtual objects identified through a layer according to the number of pieces of content included thereby based on an album folder are described above, the foregoing descriptions are just an example, and examples are not limited thereto.

Figure 11:
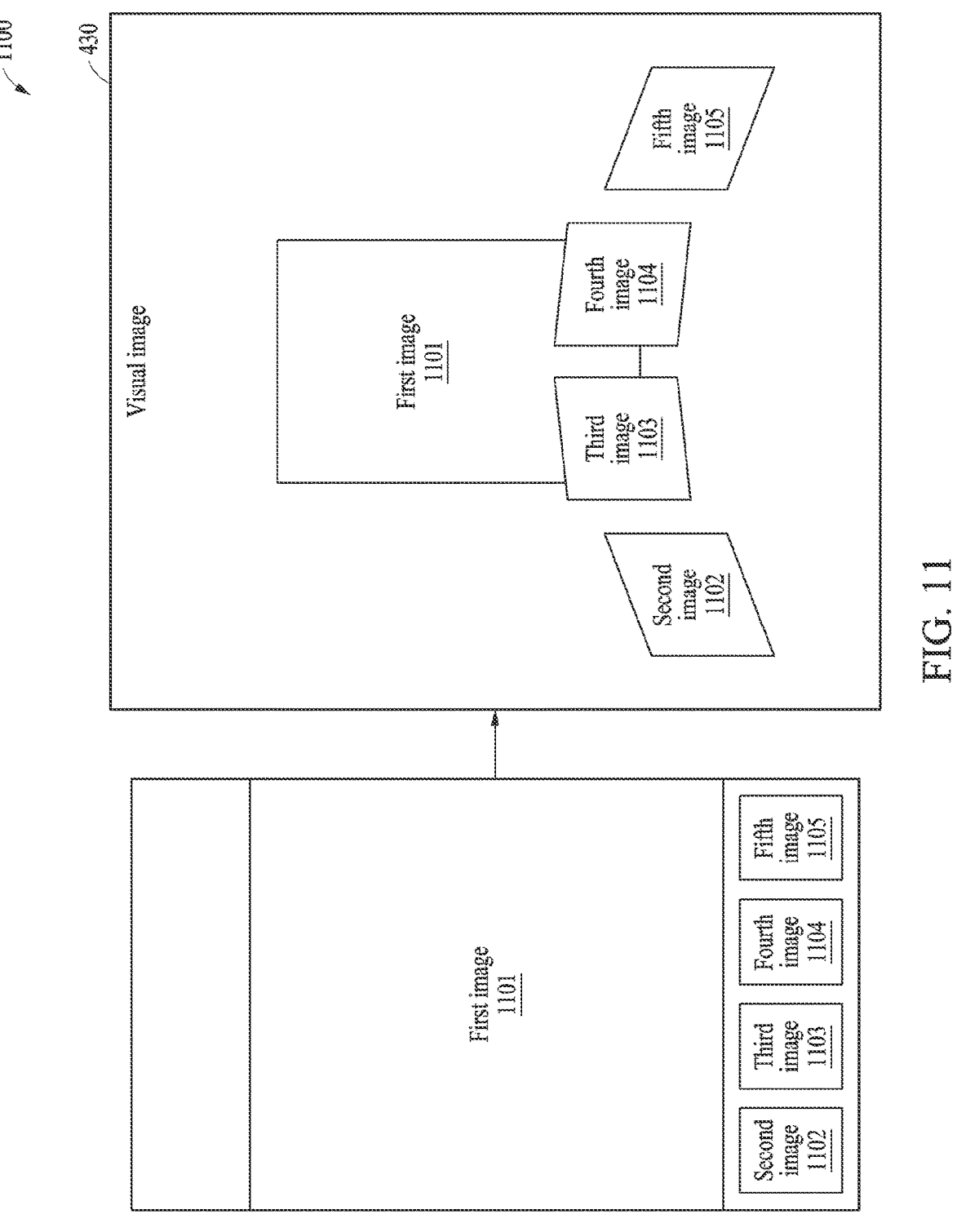
FIG. 11 is a diagram illustrating content identified by depth according to one embodiment.

FIG. 11 is a diagram 1100 illustrating content identified by depth according to one embodiment.

Referring to FIG. 11, a first image 1101, a second image 1102, a third image 1103, a fourth image 1104, and a fifth image 1105 that are displayed on a screen of an electronic device (e.g., the electronic device 102 or 104 of FIG. 1, the electronic device 401 of FIG. 4, and the electronic device 501 of FIG. 5) are illustrated. For example, the screen of the electronic device may be an execution screen of a gallery application for displaying images.

When converting the screen of the electronic device to be displayed in a visual image 430, the second image 1102 to the fifth image 1105 may be arranged before or in front of the first image 1101 when displayed as the visual image 430 on the head-mounted electronic device.

A perceptional depth may be generated by arranging the second image 1102 to the fifth image 1105 before the first image 1101 when displayed as the visual image 430 on the head-mounted electronic device. In addition, a perceptional depth may also be generated from the second image 1102 to the fifth image 1105 by being arranged in an arc form when displayed as the visual image 430 on the head-mounted electronic device.

According to one embodiment, a processor (e.g., the processor 120 of FIG. 1) of a head-mounted electronic device (e.g., the electronic device 101 of FIG. 1 and the head-mounted electronic device 201 of FIG. 2) may convert the color of content according to the type of the visual image 430. When the visual image 430 is in an AR or VST environment, visibility may decrease due to light interference. Accordingly, the processor of the head-mounted electronic device may control the color of the content displayed in the visual image 430, as well as the color of virtual objects. When the visual image 430 is a first visual image (e.g., the first visual image 701 of FIG. 7), the processor of the head-mounted electronic device may control the color of an image. The processor of the head-mounted electronic device may control a brightness and a saturation of an image.

According to one embodiment, a processor of the electronic device may control the color of content according to the type of the visual image 430. When the visual image 430 is in an AR or VST environment, visibility may decrease due to light interference. Accordingly, the processor of the electronic device may control the color of the content displayed in the visual image 430, as well as the color of virtual objects. When the visual image 430 is the first visual image, the processor of the electronic device may control the color of an image. The processor of the electronic device may control a brightness and a saturation of an image.

Hereinafter, a description of a time of a change of a visual image from a second visual image to the first visual image is provided.

Figure 12:
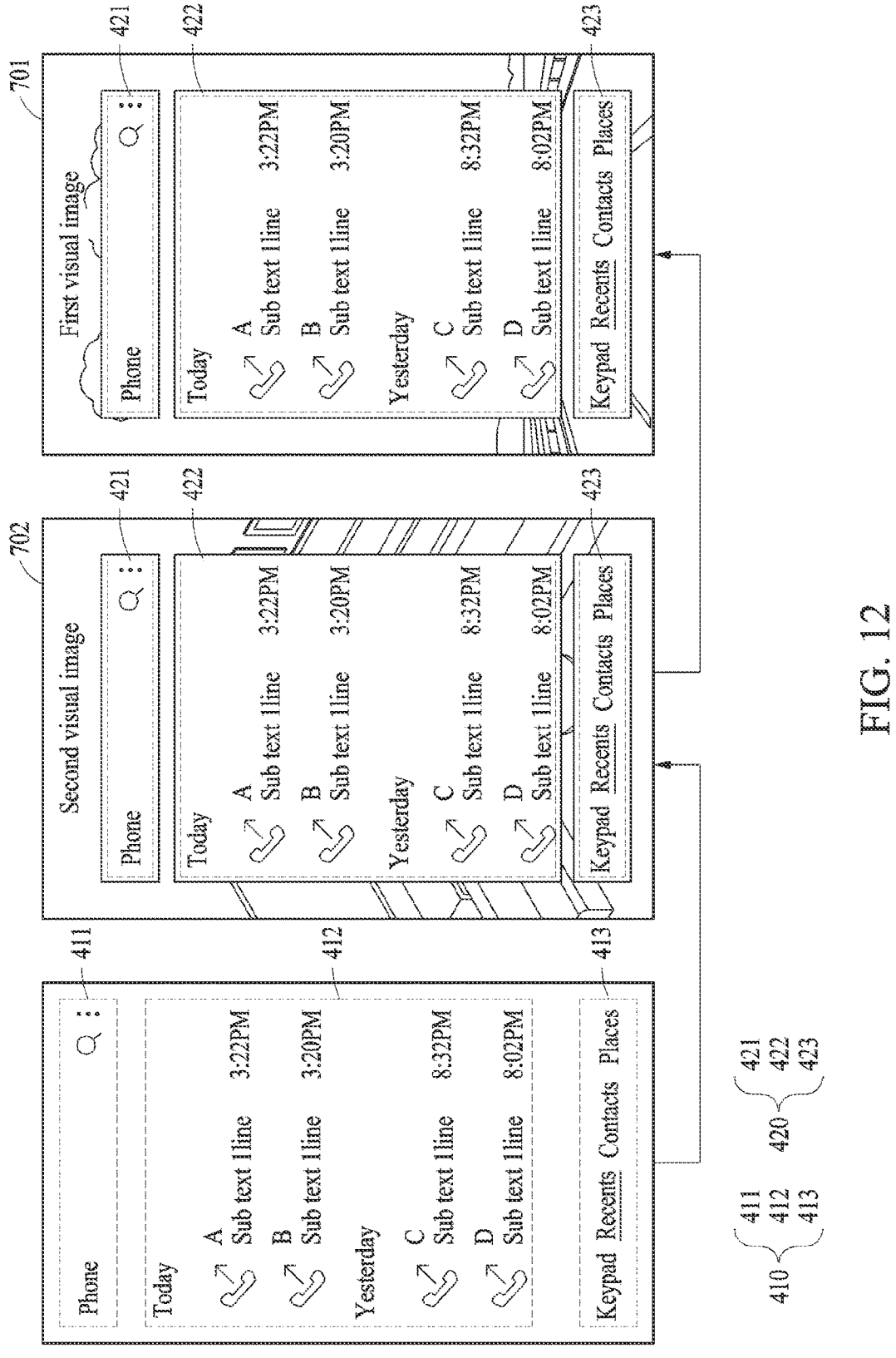
FIG. 12 is a diagram illustrating a virtual object according to a change of a visual image, according to one embodiment.

FIG. 12 is a diagram 1200 illustrating a virtual object according to a change of a visual image, according to one embodiment.

Referring to FIG. 12, a plurality of objects 410, a plurality of virtual objects 420 in a second visual image 702, and the virtual objects 420 in a first visual image 701 are illustrated. The first visual image 701 and the second visual image 702 can be displayed on the head-mounted electronic device. Referring to FIG. 12, the objects 410 may be converted into the virtual objects 420 in the second visual image 702. When a visual image changes to the first visual image 701, the color of the virtual objects 420 in the second visual image 702 may be controlled.

An example of the objects 410 being converted into the virtual objects 420 in the second visual image 702 is first described. The virtual objects 420 may be arranged in the second visual image 702 based on an arrangement of the objects 410. In this case, as described with reference to FIG. 7, the second visual image 702 may be a VR environment, which outputs a virtual environment, and light interference may not occur therein, unlike in the first visual image 701. Accordingly, a theme of the virtual objects 420 may be determined to be the same theme as a color corresponding to an execution screen of an application. The color of the virtual objects 420 may be determined to be the same color as that of the objects 410. The virtual objects 420 in the second visual image 702 may be determined to have the same brightness and saturation as those of the objects 410.

An example of a visual image changing to the first visual image 701 in the second visual image 702 according to a user's command is described. The visibility of the virtual objects 420 in the first visual image 701 may decrease due to light interference. In this case, as described with reference to FIG. 7, the color of a plurality of objects may be controlled. Accordingly, the color of the virtual objects 420 in the first visual image 701 may be further controlled compared to the color of the virtual objects 420 in the second visual image. The brightness and saturation of the virtual objects 420 in the first visual image 701 may be further controlled compared to the brightness and saturation of the virtual objects 420 in the second visual image.

Conversely, when a visual image changes from the first visual image 701 to the second visual image 702, the color of the virtual objects 420 in the first visual image 701 may be controlled to become the same as the color of the objects 410. When the visual image changes from the first visual image 701 to the second visual image 702, the brightness and saturation of the virtual objects 420 in the first visual image 701 may be controlled to become the same as the brightness and saturation of the objects 410.

In the descriptions above, the virtual objects 420 may be controlled by a processor (e.g., the processor 120 of FIG. 1) of a head-mounted electronic device (e.g., the electronic device 101 of FIG. 1 and the head-mounted electronic device 201 of FIG. 2) or a processor of an electronic device (e.g., the electronic device 102 or 104 of FIG. 1, the electronic device 401 of FIG. 4, and the electronic device 501 of FIG. 5).

Figure 13:
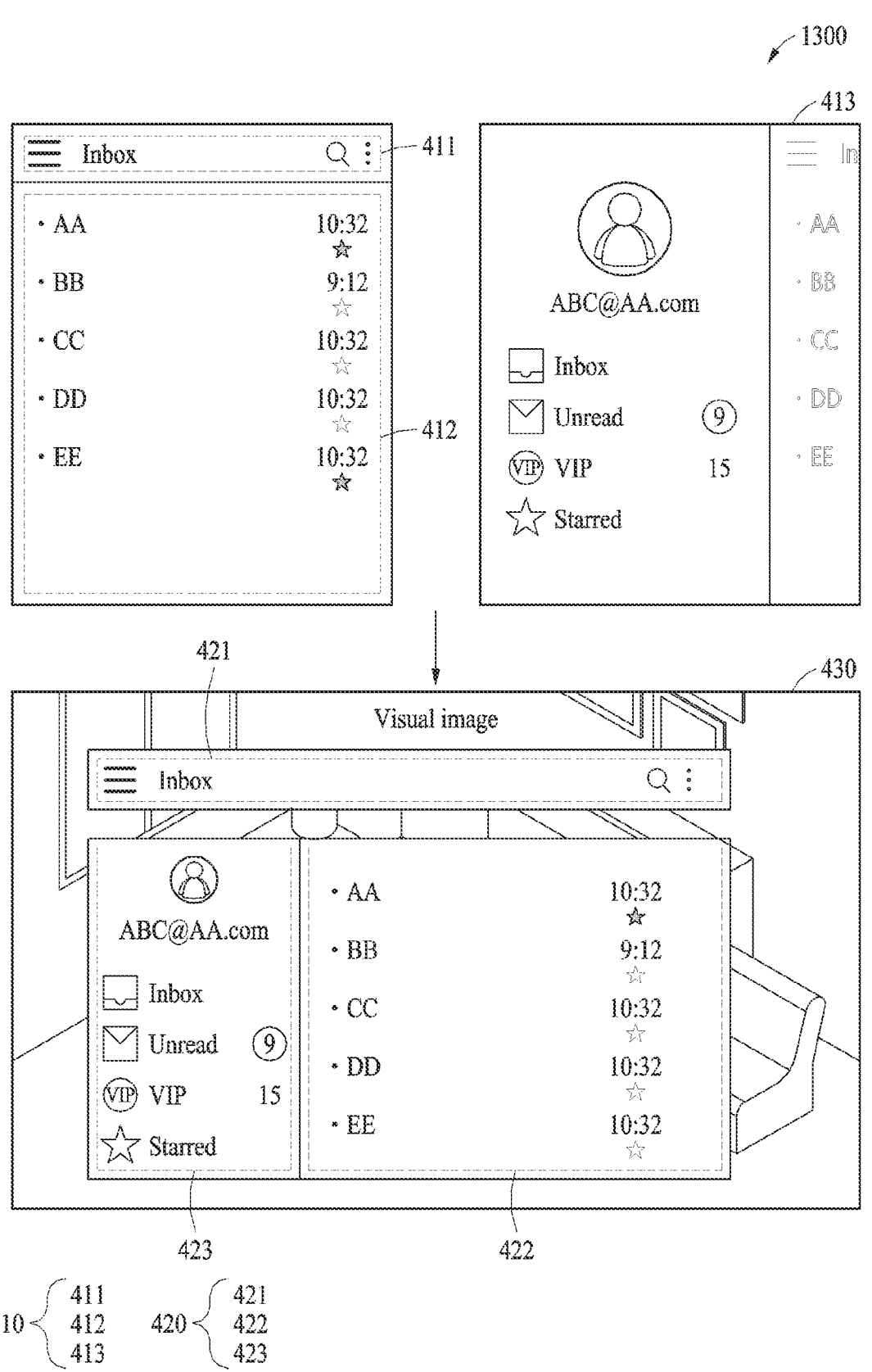
FIG. 13 is a diagram illustrating the expansion of a screen in an XR environment, according to one embodiment.

FIG. 13 is a diagram 1300 illustrating the expansion of a screen in an XR environment, according to one embodiment.

Referring to FIG. 13, a first object 411, a second object 412, and a third object 413 included in a plurality of objects 410 of an electronic device (e.g., the electronic device 102 or 104 of FIG. 1, the electronic device 401 of FIG. 4, and the electronic device 501 of FIG. 5) are illustrated. The third object 413 may be an expansion object for expanding the screen left and right or up and down. Referring to FIG. 13, a first virtual object 421, a second virtual object 422, and a third virtual object 423 included in a plurality of virtual objects 420 displayed in a visual image 430 are illustrated. The third virtual object 423 may be an expanded virtual object converted from the third object 413, that is, an expanded object.

The visual image 430 may be a first visual image (e.g., the first visual image 701 of FIG. 7) that is an AR or VST environment or a second visual image (e.g., the second visual image 702 of FIG. 7) that is the VST environment. Accordingly, the visual image 430 may display an object in a field of view of a user wearing a head-mounted electronic device (e.g., the electronic device 101 of FIG. 1 and the head-mounted electronic device 201 of FIG. 2). Therefore, the head-mounted electronic device may include a larger amount of content or a larger number of pieces of content to be displayed compared to a screen of the electronic device. Accordingly, the displaying of an expanded object (e.g., the third virtual object 423 of FIG. 13) in the visual image 430 in advance on the head-mounted electronic device may be more efficient than the displaying of the expanded object in the visual image 430 through a separate operation.

According to one embodiment, when a menu icon of the first object 411 is selected, or when the screen of the electronic device is swiped to the right, the third object 413 may not be displayed on the screen. The third object 413 may be the expanded object. The third object 413 may be displayed on the screen by being slid to the right at the same time when the screen displaying the first object 411 and the second object 412 are swiped to the right. The first object 411, the second object 412, and the third object 413 may respectively be converted into the first virtual object 421, the second virtual object 422, and the third virtual object 423. In this case, the third virtual object 423 may be an expanded virtual object when represented on the head-mounted electronic device.

According to one embodiment, a processor (e.g., the processor 120 of FIG. 1) of the head-mounted electronic device (e.g., the electronic device 101 of FIG. 1 and the head-mounted electronic device 201 of FIG. 2) or a processor of the electronic device may display an expanded virtual object converted from an expanded object together with a virtual object converted from an object in the visual image 430 when the screen is expanded by the expanded object when any one of objects is selected by the user. For example, the expanded virtual object may be displayed together with the first virtual object 421 and the second virtual object 422 in the visual image 430 of the head-mounted electronic device. Since the expanded object is displayed on the left of the second object 412 by being slid from the left to the right when the screen of the electronic device is swiped to the right, the expanded virtual object may be on the left of the second virtual object 422 in the head-mounted electronic device.

Figure 14:
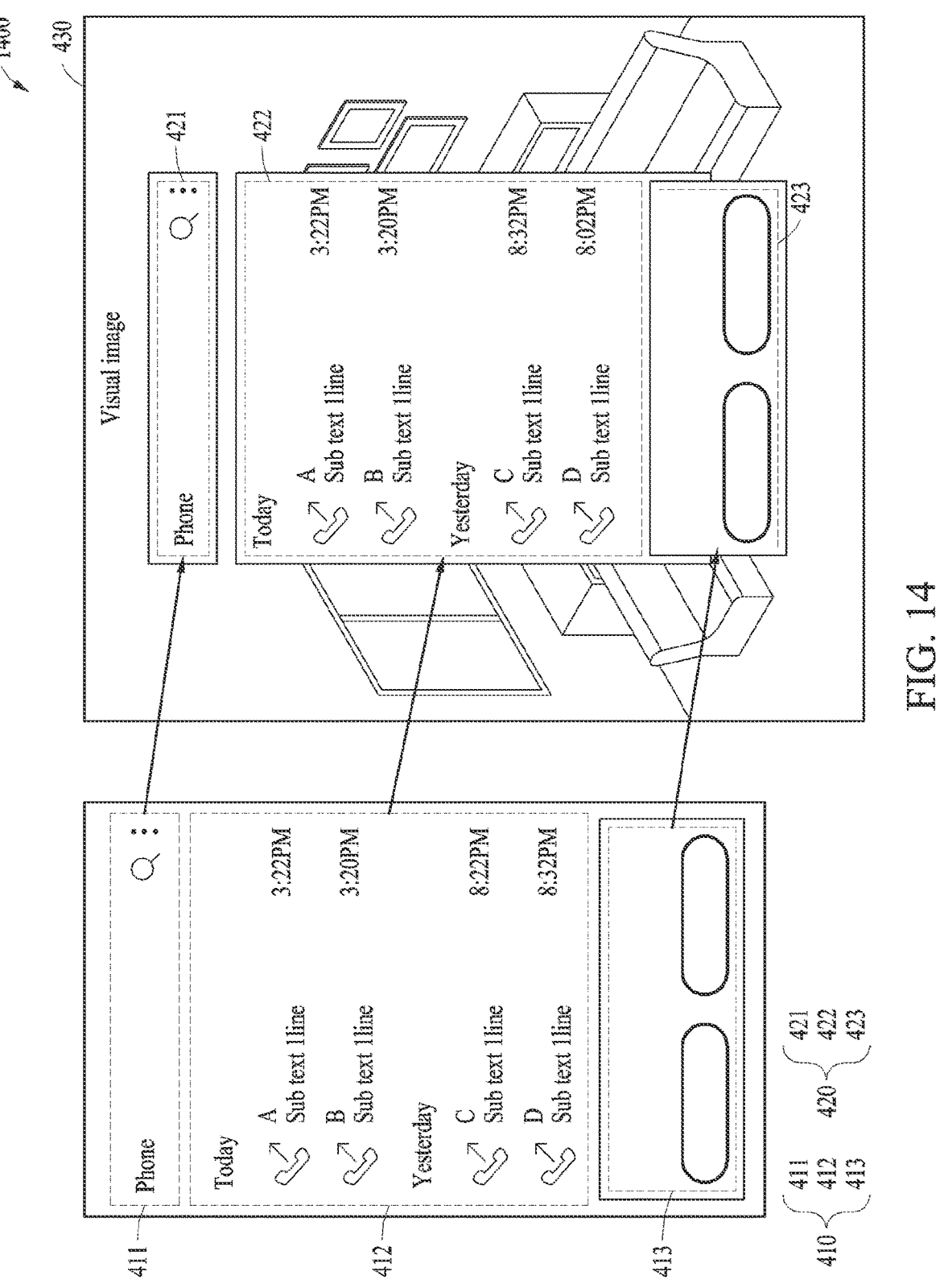
FIG. 14 is a diagram illustrating a display of a pop-up object, according to one embodiment.

FIG. 14 is a diagram 1400 illustrating a display of a pop-up object, according to one embodiment.

Referring to FIG. 14, a first object 411, a second object 412, and a third object 413 may be displayed. The third object 413 may be a pop-up object generated by a specific event while the first object 411 and the second object 412 are being displayed. For example, a pop-up object for notifying a user of a warning may be generated while the first object 411 and the second object 412 are being displayed on a screen.

The pop-up object may be displayed by overlapping with the second object 412 being displayed on the screen.

Likewise, a third virtual object 423 that is a pop-up virtual object may be displayed by a specific event while a first virtual object 421 and a second virtual object 422 that are respectively converted from the first object 411 and the second object 412 are being displayed in a visual image 430 of the head-mounted electronic device. The pop-up visual object may be a new virtual object generated in the visual image 430 by the specific event after the first virtual object 421 and the second virtual object 422 are displayed in the visual image 430.

A pop-up virtual object may be an object that is converted from a pop-up object to be displayed in the visual image 430. The pop-up virtual object may have the same name as that of the pop-up object. The pop-up virtual object may be arranged based on an arrangement of the pop-up object. For example, the pop-up virtual object may be displayed at the bottom by overlapping with a second object.

According to one embodiment, the pop-up virtual object may be a virtual object displaying content grouped based on a criterion different from that of objects being first displayed in the visual image 430. Accordingly, the pop-up virtual object may be distinguished by a depth by being floated and displayed before or in front of the first virtual object 421 and the second virtual object 422.

In the descriptions above, the virtual objects 420 may be controlled by a processor (e.g., the processor 120 of FIG. 1) of a head-mounted electronic device (e.g., the electronic device 101 of FIG. 1 and the head-mounted electronic device 201 of FIG. 2) or a processor of an electronic device (e.g., the electronic device 102 or 104 of FIG. 1, the electronic device 401 of FIG. 4, and the electronic device 501 of FIG. 5).

Figure 15:
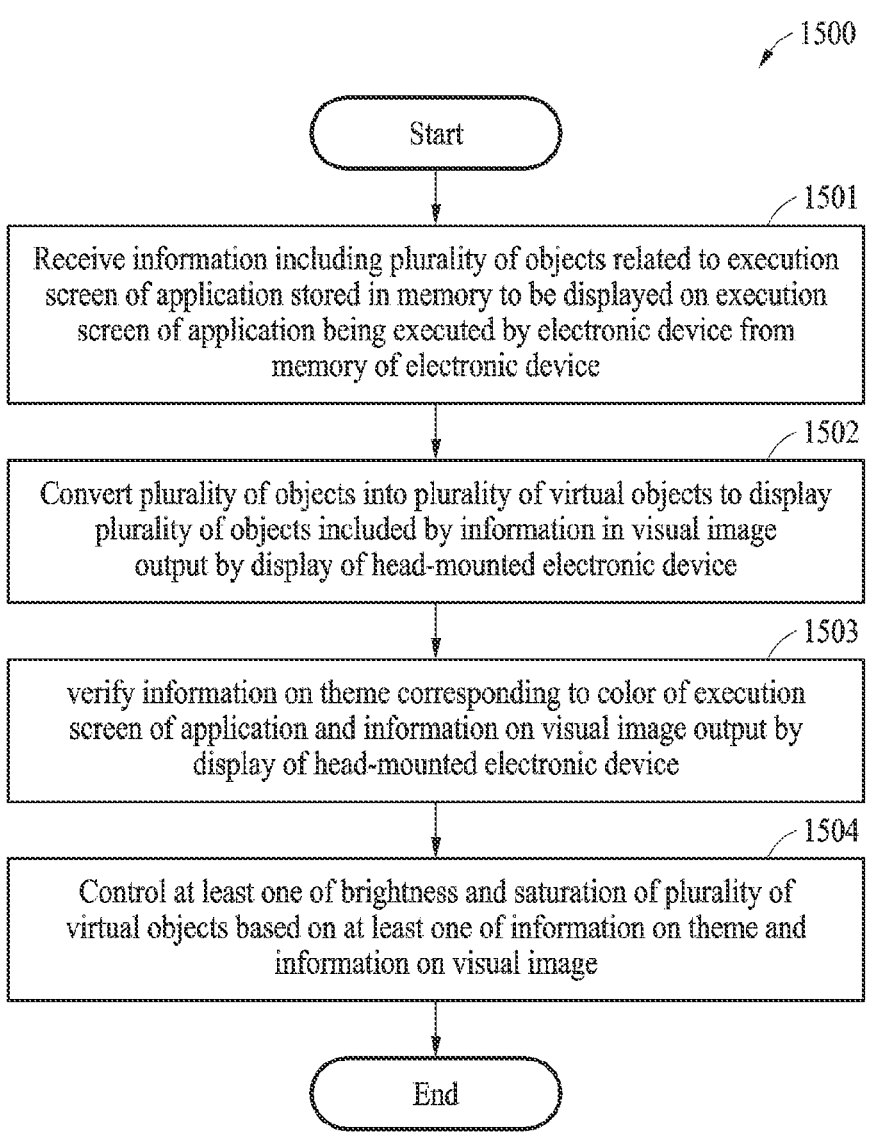
FIG. 15 is a flowchart illustrating a method of operating an electronic device, according to one embodiment.

FIG. 15 is a flowchart illustrating a method 1500 of operating an electronic device, according to one embodiment.

In the following examples, operations may be performed sequentially, but may not be necessarily performed sequentially. For example, the order of the operations may be changed and at least two of the operations may be performed in parallel. Operations 1501 to 1504 may be performed by the electronic device (e.g., the electronic device 102 or 104 of FIG. 1, the electronic device 401 of FIG. 4, and the electronic device 501 of FIG. 5). Specifically, operations 1501 to 1504 may be performed by a processor of the electronic device.

In operation 1501, the electronic device may receive, from a memory of the electronic device, information including a plurality of objects (e.g., the objects 410 of FIG. 4) related to an execution screen of an application that has been stored in the memory to be displayed on the execution screen of the application being executed.

According to one embodiment, a display (e.g., the display 402 of FIG. 4 and the display 502 of FIG. 5) may display the execution screen of the application. The execution screen may include the objects, and the objects may display pieces of content related to the application.

In operation 1502, the objects included by the information may be converted into a plurality of virtual objects (e.g., the virtual objects 420 of FIG. 4) to be displayed in a visual image (e.g., the visual image 430 of FIG. 4) that is output by a display (e.g., the display module 160 of FIG. 1 and the display 240 of FIG. 2) of a head-mounted electronic device (e.g., the electronic device 101 of FIG. 1 and the head-mounted electronic device 201 of FIG. 2).

In operation 1503, information on a theme corresponding to a color of the execution screen of the application and information on the visual image that is output by the display of the head-mounted electronic device may be verified.

In operation 1504, at least one of a brightness and a saturation of the virtual objects may be controlled based on at least one of the information on the theme and the information on the visual image. The electronic device is configured to transfer data to the head-mounted electronic device, where the data can include the information for the theme corresponding to the color of the execution screen of the application, the information for the visual image, and the information for the brightness and the saturation of the virtual objects.

The above descriptions provided with reference to FIGS. 1 to 14 may apply to the operations illustrated in FIG. 15, and thus further detailed descriptions thereof are omitted.

According to one embodiment, the execution screen of the application may include a background object (e.g., the background object 503 of FIG. 5) of the execution screen and the objects arranged on the background object. The name of each object included by the objects may be predetermined, and pieces of content related to the object may be grouped and displayed.

According to one embodiment, an object may include one or more detailed objects (e.g., the first detailed object 412-1 and the second detailed object 412-2 of FIG. 9) related to the object. A virtual object may include one or more detailed virtual objects (e.g., the first detailed virtual object 422-1 and the second detailed virtual object 422-2 of FIG. 9) related to the virtual object.

According to one embodiment, a processor may identify an arrangement of the objects from the execution screen of the application being executed by the electronic device. The processor may arrange the virtual objects, to correspond to the arrangement of the objects from the execution screen of the application, in the visual image displayed by the display of the head-mounted electronic device.

According to one embodiment, the processor may arrange a virtual object in the same arrangement as an arrangement on the screen of the electronic device of an object having the same name as the virtual object in the visual image displayed by the display of the head-mounted electronic device.

According to one embodiment, the processor may convert the size of the virtual objects and the size of a font included by the virtual objects based on the size of the visual image provided to the user.

According to one embodiment, the processor may determine a theme corresponding to a color of the virtual objects displayed on the display of the head-mounted electronic device to match a theme corresponding to a color of the execution screen of the application.

According to one embodiment, the visual image may include a first visual image (e.g., the first visual image 701 of FIG. 7) outputting a surrounding environment of the user that is captured by a camera of the head-mounted electronic device or a second visual image (e.g., the second visual image 702 of FIG. 7) outputting a virtual environment. The processor may determine whether the display of the head-mounted electronic device outputs the first visual image or the second visual image. The processor may control at least one of a brightness and a saturation of the virtual objects according to the visual image to be output.

According to one embodiment, each virtual object included by the virtual objects may group and display pieces of content related to the virtual object, and the virtual object may be displayed by being identified from another virtual object by a depth on the display of the head-mounted electronic device.

According to one embodiment, when any one of the virtual objects includes pieces of content, a layer that overlaps with the virtual object and is displayed may be added. The virtual object may be distinguished from another virtual object by a layer.

According to one embodiment, the processor may control at least one of a brightness and a saturation of the virtual objects when the display of the head-mounted electronic device converts the screen from the second visual image to the first visual image or from the first visual image to the second visual image.

According to one embodiment, the processor may identify a new virtual object from the virtual objects displayed on the display by using a depth when the new virtual object is displayed in the visual image of the display of the head-mounted electronic device after the virtual objects are displayed in the visual image of the display of the head-mounted electronic device.

Figure 16:
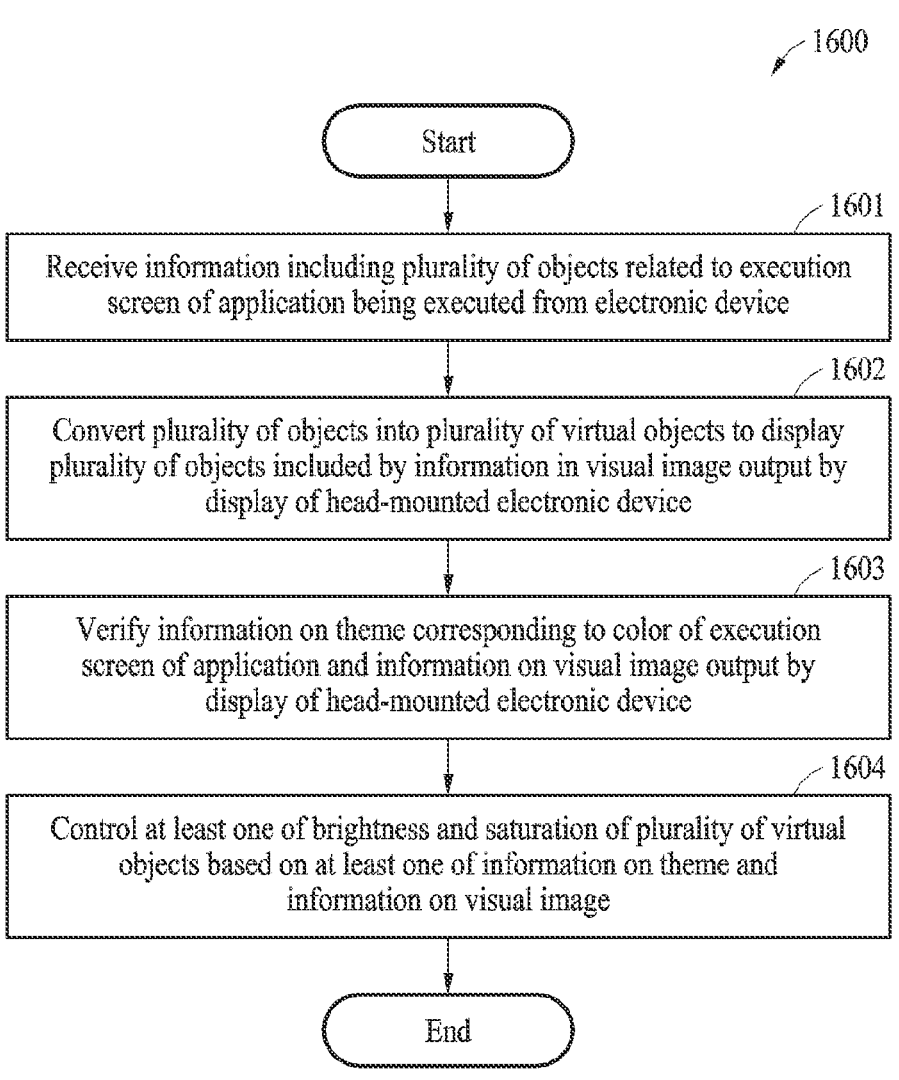
FIG. 16 is a flowchart illustrating a method of operating a head-mounted electronic device, according to one embodiment.

FIG. 16 is a flowchart illustrating a method 1600 of operating a head-mounted electronic device, according to one embodiment.

In the following examples, operations may be performed sequentially, but may not be necessarily performed sequentially. For example, the order of the operations may be changed and at least two of the operations may be performed in parallel. Operations 1601 to 1604 may be performed by the head-mounted electronic device (e.g., the electronic device 101 of FIG. 1 and the head-mounted electronic device 201 of FIG. 2). Specifically, operations 1601 to 1604 may be performed by a processor (e.g., the processor 120 of FIG. 1) included in the head-mounted electronic device.

In operation 1601, the processor of the head-mounted electronic device may receive information including a plurality of objects (e.g., the objects 410 of FIG. 4) related to an execution screen of an application being executed from an electronic device (e.g., the electronic device 102 or 104 of FIG. 1, the electronic device 401 of FIG. 4, and the electronic device 501 of FIG. 5).

According to one embodiment, a display (e.g., the display 402 of FIG. 4 and the display 502 of FIG. 5) of the electronic device may display the execution screen of the application. The execution screen may include the objects. The objects may display pieces of content related to the application.

In operation 1602, the processor of the head-mounted electronic device may convert the objects into a plurality of virtual objects (e.g., the virtual objects 420 of FIG. 4) to display the objects, which are included by the information, in a visual image (e.g., the visual image 430 of FIG. 4) that is output by a display (e.g., the display module 160 of FIG. 1 and the display 240 of FIG. 2) of the head-mounted electronic device.

In operation 1603, the processor of the head-mounted electronic device may verify information on a theme corresponding to a color of the execution screen of the application and information on the visual image output by the display of the head-mounted electronic device.

In operation 1604, the processor of the head-mounted electronic device may control at least one of a brightness and a saturation of the virtual objects based on at least one of the information on the theme and the information on the visual image. The head-mounted electronic device is configured to received data from the electronic device, where the data can include the information for the theme corresponding to the color of the execution screen of the application, the information for the visual image, and the information for the brightness and the saturation of the virtual objects.

The above descriptions provided with reference to FIGS. 1 to 14 may apply to the operations illustrated in FIG. 16, and thus further detailed descriptions thereof are omitted.

According to one embodiment, the execution screen of the application may include a background object (e.g., the background object 503 of FIG. 5) of the execution screen and the objects arranged on the background object. The name of each object included by the objects may be predetermined, and pieces of content related to the object may be grouped and displayed.

According to one embodiment, an object may include one or more detailed objects (e.g., the first detailed object 412-1 and the second detailed object 412-2 of FIG. 9) related to the object. A virtual object may include one or more detailed virtual objects (e.g., the first detailed virtual object 422-1 and the second detailed virtual object 422-2 of FIG. 9) related to the virtual object.

According to one embodiment, the processor of the head-mounted electronic device may identify an arrangement of the objects from the execution screen of the application being executed by the electronic device. The processor of the head-mounted electronic device may arrange the virtual objects, to correspond to the arrangement of the objects from the execution screen of the application, in the visual image displayed by the display of the head-mounted electronic device.

According to one embodiment, the processor of the head-mounted electronic device may determine a theme corresponding to a color of the virtual objects displayed on the display of the head-mounted electronic device to match a theme corresponding to a color of the execution screen of the application.

According to one embodiment, the processor of the head-mounted electronic device may arrange a virtual object in the same arrangement as the arrangement in the screen of the electronic device of the object having the same name as the virtual object in the visual image displayed by the display of the head-mounted electronic device.

According to one embodiment, the processor of the head-mounted electronic device may convert the size of the virtual objects and the size of a font included by the virtual objects based on the size of the visual image provided to the user.

According to one embodiment, the processor of the head-mounted electronic device may determine a theme corresponding to a color of the virtual objects displayed on the display of the head-mounted electronic device to match a theme corresponding to a color of the execution screen of the application.

According to one embodiment, the processor of the head-mounted electronic device may determine whether the display of the head-mounted electronic device outputs a first visual image (e.g., the first visual image 701 of FIG. 7) or a second visual image (e.g., the second visual image 702 of FIG. 7). The processor of the head-mounted electronic device may control at least one of a brightness and a saturation of the virtual objects according to the visual image to be output.

According to one embodiment, each virtual object included by the virtual objects may group and display pieces of content related to the virtual object, and the virtual object may be displayed by being identified from another virtual object by a depth on the display of the head-mounted electronic device.

According to one embodiment, when any one of the virtual objects includes pieces of content, a layer that overlaps with the virtual object and is displayed may be added. The virtual object may be distinguished from another virtual object by a layer.

According to one embodiment, the processor of the head-mounted electronic device may control at least one of a brightness and a saturation of the virtual objects when the display of the head-mounted electronic device converts the screen from the second visual image to the first visual image or from the first visual image to the second visual image.

According to one embodiment, the processor of the head-mounted electronic device may identify a new virtual object from the virtual objects displayed on the display by using a depth when the new virtual object is displayed in the visual image of the display of the head-mounted electronic device after the virtual objects are displayed in the visual image of the display of the head-mounted electronic device.

According to one or more embodiments, an electronic device includes a memory having computer readable instructions and a processor for executing the computer readable instructions. The computer readable instructions control the processor to perform operations including displaying, on a display, objects related to an execution screen of an application being executed, the objects being configured to display pieces of content related to the application and converting the objects into virtual objects to be displayed in a visual image output on a head-mounted electronic device. The processor performing operations including verifying a first information of a theme corresponding to a color of the execution screen of the application displayed on the display and a second information of the visual image output by the head-mounted electronic device and controlling at least one of a brightness and a saturation of the virtual objects in the visual image output on the head-mounted electronic device based on at least one of the first information of the theme and the second information of the visual image.

The embodiments of the present disclosure disclosed in the specification and the drawings are merely presented to easily describe technical contents of the embodiments of the present disclosure and help the understanding of them and are not intended to limit the embodiments. Therefore, all changes or modifications derived from the technical idea of the embodiments of the present disclosure as well as the embodiments disclosed herein should be construed to fall within the embodiments.

What is claimed is:

1. An electronic device comprising:

memory having computer readable instructions; and at least one processor for executing the computer readable instructions, the computer readable instructions, when executed by the at least one processor individually or collectively, cause the electronic device to:

display, on a display, objects related to an execution screen of an application being executed, the objects being configured to display pieces of content related to the application;

convert, by the electronic device, the objects into virtual objects to be displayed in a visual image output on a head-mounted electronic device;

in response to converting the objects into the virtual objects by the electronic device, transmit the visual image of the virtual objects to the head-mounted electronic device for output by the bead-mounted electronic device;

in response to transmitting the visual image of the virtual objects to the head-mounted electronic device, verify a first information of a theme corresponding to a color of the execution screen of the application displayed on the display and a second information of the visual image having been transmitted for output by the head-mounted electronic device; and control at least one of a brightness and a saturation of the virtual objects in the visual image output on the head-mounted electronic device based on at least one of the first information of the theme and the second information of the visual image.

2. The electronic device of claim 1, wherein:

the execution screen of the application comprises a background object of the execution screen and the objects on the background object, each of the objects being named in advance; and pieces of content related to the objects are grouped and displayed; and the computer readable instructions cause the electronic device to select at least one of a light theme or a dark theme for the visual image output by the head-mounted electronic device.

3. The electronic device of claim 1, wherein:

the objects comprise one or more detailed objects related to the objects; and the virtual objects comprise one or more detailed virtual objects related to the virtual objects.

4. The electronic device of claim 1, wherein the computer readable instructions cause the electronic device to identify an arrangement of the objects from the execution screen of the application being executed and arrange the virtual objects in the visual image displayed on the head-mounted electronic device to correspond to the arrangement.

5. The electronic device of claim 1, wherein the computer readable instructions cause the electronic device to arrange the virtual objects in the visual image displayed on the head-mounted electronic device in a same arrangement as an arrangement in the execution screen of the electronic device for the objects having a same name as the virtual objects in the visual image.

6. The electronic device of claim 1, wherein the computer readable instructions cause the electronic device to convert a size of the virtual objects and a size of a font comprised by the virtual objects based on a size of the visual image output on the head-mounted electronic device.

7. The electronic device of claim 1, wherein the computer readable instructions cause the electronic device to determine a theme corresponding to a color of the virtual objects displayed on the head-mounted electronic devices to match the theme corresponding to the color of the execution screen of the application.

8. The electronic device of claim 1, wherein:

the visual image comprises a first visual image configured to output a surrounding environment of a user captured by one or more cameras of the head-mounted electronic device or a second visual image configured to output a virtual environment; and the computer readable instructions cause the electronic device to determine whether the first visual image or the second visual image is output on the head-mounted electronic device and control at least one of the brightness and the saturation of the virtual objects according to the visual image that is output.

9. The electronic device of claim 1, wherein:

each of the virtual objects is configured to group and display pieces of content related to the virtual objects; and each of the virtual objects is displayed on the head-mounted electronic device to be identified by depth from other virtual objects.

10. The electronic device of claim 1, wherein, when a virtual object of the virtual objects comprises pieces of content, overlapping layers are used to distinguish the pieces of content of the virtual object of the virtual objects from other virtual objects.

11. The electronic device of claim 1, wherein the computer readable instructions cause the electronic device to, when converting the execution screen from a second visual image to a first visual image or from the first visual image to the second visual image, modify at least one of the brightness and the saturation of the virtual objects.

12. The electronic device of claim 1, wherein the computer readable instructions cause the electronic device to, when a new virtual object is displayed in the visual image of the head-mounted electronic device in response to the virtual objects being displayed in the visual image of the head-mounted electronic device, identify the new virtual object from the virtual objects being displayed by using depth.

13. A method of operating an electronic device, the method comprising:

displaying, on a display, objects related to an execution screen of an application being executed, the objects being configured to display pieces of content related to the application;

converting, by the electronic device, the objects into virtual objects to be displayed in a visual image output on a head-mounted electronic device;

in response to converting the objects into the virtual objects by the electronic device, transmit the visual image of the virtual objects to the head-mounted electronic device for output by the bead-mounted electronic devices;

in response to transmitting the visual image of the virtual objects to the head-mounted electronic device, verifying a first information of a theme corresponding to a color of the execution screen of the application displayed on the display and a second information of the visual image having been transmitted for output by the head-mounted electronic device; and controlling at least one of a brightness and a saturation of the virtual objects in the visual image output on the head-mounted electronic device based on at least one of the first information of the theme and the second information of the visual image.

* * * * *